US007756413B2

(12) United States Patent
Matsui

(10) Patent No.: US 7,756,413 B2
(45) Date of Patent: Jul. 13, 2010

(54) ILLUMINATING DEVICE FOR PHOTOGRAPHING AND CAMERA

(75) Inventor: Hideki Matsui, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/379,037

(22) Filed: Feb. 11, 2009

(65) Prior Publication Data

US 2009/0161337 A1 Jun. 25, 2009

Related U.S. Application Data

(62) Division of application No. 11/132,384, filed on May 19, 2005, now Pat. No. 7,509,043.

(30) Foreign Application Priority Data

| May 25, 2004 | (JP) | 2004-154999 |
| Jun. 22, 2004 | (JP) | 2004-183594 |
| Jun. 22, 2004 | (JP) | 2004-183595 |

(51) Int. Cl.
*G03B 15/03* (2006.01)
(52) U.S. Cl. .................. 396/164; 396/182; 396/201
(58) Field of Classification Search ................ 396/164, 396/182, 201; 348/370, 371
See application file for complete search history.

(56) References Cited

U.S. PATENT DOCUMENTS

| 5,835,794 A * | 11/1998 | Lo et al. .......... 396/4 |
| 6,400,455 B1 | 6/2002 | Kurokawa et al. |
| 6,697,116 B1 * | 2/2004 | Kurokawa et al. .......... 348/371 |
| 6,749,310 B2 * | 6/2004 | Pohlert et al. .......... 362/11 |
| 2003/0048375 A1 | 3/2003 | Seim |
| 2005/0046739 A1 * | 3/2005 | Voss et al. .......... 348/371 |
| 2005/0168965 A1 | 8/2005 | Yoshida |
| 2006/0257130 A1 * | 11/2006 | Lee et al. .......... 396/106 |

FOREIGN PATENT DOCUMENTS

| JP | A-63-264378 | 11/1988 |
| JP | U-8-1029 | 6/1996 |
| JP | A-11-162234 | 6/1999 |
| JP | A-2001-103369 | 4/2001 |
| JP | A-2002-093207 | 3/2002 |
| JP | A-2002-207236 | 7/2002 |
| JP | A-2003-114462 | 4/2003 |
| JP | A-2003-114463 | 4/2003 |
| JP | A-2003-215673 | 7/2003 |
| JP | A-2005-215634 | 8/2005 |

OTHER PUBLICATIONS

Feb. 9, 2010 Office Action for Japanese Patent Application No. 2004-154999 (with translation).
Apr. 20, 2010 Office Action issued in Japanese Patent Application No. 2004-183595 (with translation).
Apr. 27, 2010 Office Action issued in Japanese Patent Application No. 2004-183594 (with translation).

* cited by examiner

*Primary Examiner*—W. B. Perkey
(74) *Attorney, Agent, or Firm*—Oliff & Berridge, PLC

(57) ABSTRACT

An illuminating device for photographing includes: an illuminating unit having a plurality of current-controlled light emitting elements, which illuminates a subject with light emitted from the plurality of light emitting elements; a storage unit in which light emission brightness information is stored in correspondence to each of the plurality of light emitting elements; and a light emission control unit that controls light emission at the plurality of light emitting elements based upon the light emission brightness information stored in the storage unit so that the plurality of light emitting elements achieve uniform brightness levels at the subject.

5 Claims, 22 Drawing Sheets

ILLUMINATING DEVICE FOR PHOTOGRAPHING AND CAMERA

This is a Division of application Ser. No. 11/132,384 filed May 19, 2005, which claims the benefit of Japanese Patent Applications No. 2004-154999 filed May 25, 2004, No. 2004-183594 filed Jun. 22, 2004 and No. 2004-183595 filed Jun. 22, 2004. The disclosures of the prior applications are hereby incorporated by reference herein in their entirety.

BACKGROUND OF THE INVENTION

1. Field of the Invention

The present invention relates to an illuminating device that illuminates a subject during a photographing operation and a camera.

2. Description of Related Art

There is a camera known in the related art that illuminates a main subject with an illuminating device having a plurality of LEDs (see Japanese Laid Open Patent Publication No. 2002-207236). Japanese Laid Open Patent Publication No. 2002-207236 discloses a technology for preventing a shadow from being cast on one side of the subject due to illuminating light being emitted from a single position by distributing the plurality of LEDs on the left side and the right side relative to the photographic lens.

There is also a technology known in the related art through which the illuminating angle of illuminating light emitted from a photographic illuminating device that illuminates a subject during a photographing operation is adjusted in correspondence to the angle of view of the photographic lens in the camera (see Japanese Laid Open Patent Publication No. 2002-93207). Japanese Laid Open Patent Publication No. 2002-93207 discloses a technology that allows the illuminating angle of illuminating light generated at a light emitting element constituted with a xenon tube to vary by providing the xenon tube as a movable member capable of moving relative to a reflector.

SUMMARY OF THE INVENTION

The quantity of illuminating light emitted from a single LED is normally smaller than the quantity of illuminating light provided by a discharge-type illuminating device such as a xenon discharge tube, and for this reason, the brightness of the subject illuminated with LEDs disposed in a simple dispersive arrangement may become uneven, i.e., uneven illumination may occur.

While it is described in Japanese Laid Open Patent Publication No. 2002-207236 that shadowing of the subject can be eliminated and the overall quantity of illuminating light can be increased by fitting the illuminating device with a plurality of LEDs, the publication does not disclose that a technology for achieving intentionally nonuniform brightness within the image plane.

There is also a problem with the method in which the light emitting element is mechanically moved in that the operation for adjusting the illuminating angle becomes a time-consuming procedure.

According to the 1st aspect of the invention, an illuminating device for photographing comprises: an illuminating unit having a plurality of current-controlled light emitting elements, which illuminates a subject with light emitted from the plurality of light emitting elements; a storage unit in which light emission brightness information is stored in correspondence to each of the plurality of light emitting elements; and a light emission control unit that controls light emission at the plurality of light emitting elements based upon the light emission brightness information stored in the storage unit so that the plurality of light emitting elements achieve uniform brightness levels at the subject.

According to the 2nd aspect of the invention, in the illuminating device for photographing according to the 1st aspect, it is preferred that: the light emission brightness information includes light emission brightness data indicating light emission brightness levels achieved at the plurality of light emitting elements supplied with a predetermined electrical current and current-light emission brightness characteristics data corresponding to at least one representative light emitting element among the plurality of light emitting elements; and the light emission control unit adjusts a value of an electrical current to be supplied to each light emitting element based upon a ratio of a light emission brightness level achieved at the light emitting element supplied with the predetermined electrical current and a light emission brightness level corresponding to the predetermined electrical current which is indicated by the current-light emission brightness characteristics data.

According to the 3rd aspect of the invention, in the illuminating device for photographing according to the 1st aspect, it is preferred that: the light emission brightness information includes current supply data indicating electrical currents that need to be supplied to the plurality of light emitting elements to enable the plurality of light emitting elements to emit light with a predetermined level of brightness and current-light emission brightness characteristics data corresponding to at least one representative light emitting element among the plurality of light emitting elements; and the light emission control unit adjusts a value of an electrical current to be supplied to each light emitting element based upon a ratio of an electrical current to be supplied to the light emitting element to achieve the predetermined level of brightness and a supplied current corresponding to the predetermined level of brightness which is indicated by the current-light emission brightness characteristics data.

According to the 4th aspect of the invention, in the illuminating device for photographing according to the 1st aspect, it is preferred that the storage unit comprises a nonvolatile memory or a volatile memory to which power is supplied so as to retain memory contents.

According to the 5th aspect of the invention, an illuminating device for photographing comprises: an illuminating unit having a plurality of current-controlled light emitting elements with axes of illuminating light fluxes from the plurality of light emitting elements varied from one another, which illuminates a subject with light emitted from the plurality of light emitting elements; and a light emission control unit that controls light emission at the plurality of light emitting elements, and the light emission control unit controls the light emission at the plurality of light emitting elements in correspondence to angles formed by the illuminating light axes of the illuminating light fluxes from the individual light emitting elements and an illuminating light axis of an illuminating light flux from a reference light emitting element.

According to the 6th aspect of the invention, in the illuminating device for photographing according to the 5th aspect, it is preferred that: a first light emitting element that illuminates a center of an angle of view among the plurality of light emitting elements is used as the reference light emitting element; a distance from each of the plurality of light emitting elements to a reference plane perpendicular to the illuminating light axis of the illuminating light flux from the first light emitting element, measured along the illuminating light axis of the illuminating light flux from the light emitting element is defined as an illuminating distance of the light emitting element; and the light emission control unit implements control so as to increase a value of an electrical current to be supplied to a light emitting element relative to the value of the electrical current supplied to the first light emitting element to an extent corresponding to an extent to which the illuminating distance of the light emitting element surpasses the illuminating distance of the first light emitting element.

According to the 7th aspect of the invention, in the illuminating device for photographing according to the 5th aspect, it is preferred that: there is further provided a storage unit in which light emission brightness information is stored in correspondence to each of the plurality of light emitting elements; and the light emission control unit controls the light emission at the plurality of light emitting elements by using the light emission brightness information stored in the storage unit so that the plurality of light emitting elements achieve uniform brightness levels at the reference plane, and also controls the light emission at the plurality of light emitting elements in correspondence to angles formed by the illuminating light axes of the illuminating light fluxes from the light emitting elements and the illuminating light axis of the illuminating light flux from the reference light emitting element.

According to the 8th aspect of the invention, in the illuminating device for photographing according to the 5th aspect, it is preferred that the light emission control unit alters a number of light emitting elements to be turned on among the plurality of light emitting elements in correspondence to a focal length of a photographic lens so as not to illuminate an area beyond an angle of view.

According to the 9th aspect of the invention, an illuminating device for photographing comprises: a first illuminating unit having a plurality of current-controlled light emitting elements, which illuminates a subject with light emitted from the plurality of light emitting elements; a storage unit in which light emission brightness information is stored in correspondence to each of the plurality of light emitting elements; a discharge-controlled second illuminating unit that illuminates the subject; and a light emission control unit that controls light emission at the plurality of light emitting elements in the first illuminating unit by using the light emission brightness information stored in the storage unit so as to reduce an extent of uneven illumination of the subject attributable to the second illuminating unit.

According to the 10th aspect of the invention, in the illuminating device for photographing according to the 9th aspect, it is preferred that the light emission control unit controls the light emission at the plurality of light emitting elements in the first illuminating unit in correspondence to a focal length of a photographic lens.

According to the 11th aspect of the invention, in the illuminating device for photographing according to the 9th aspect, it is preferred that: there is further provided a prohibiting unit that prohibits light emission at the second illuminating unit, at least if a subject distance is equal to or less than a predetermined value, if sensitivity is equal to or greater than a predetermined value, or if an aperture value is set toward an open side relative to a predetermined value; and while the light emission at the second illuminating unit is prohibited by the prohibiting unit, the light emission control unit controls the light emission at the plurality of light emitting elements in the first illuminating unit by using the light emission brightness information stored in the storage unit so as to minimize an extent of uneven illumination of the subject attributable to the first illuminating unit.

According to the 12th aspect of the invention, a camera comprises an illuminating device for photographing according to any of the 1st through the 11th aspects.

According to the 13th aspect of the invention, an illuminating device for photographing comprises: an illuminating unit having a plurality of light emitting elements with axes of illuminating light fluxes from the plurality of light emitting elements different from one another, which illuminates a subject with light emitted; and a light emission control unit that performs at least one of light emission/non-emission setting and light emission brightness level setting for each of the plurality of light emitting elements, so as to achieve a specific illumination pattern.

According to the 14th aspect of the invention, in the illuminating device for photographing according to the 13th aspect, it is preferred that there is further provided: a display unit that displays a light emission/non-emission status and a light emission brightness level set for each of the plurality of light emitting elements; an operating unit that outputs an operation signal indicating the light emission/non-emission setting and an operation signal indicating the light emission brightness level setting; and a display control unit that updates display contents displayed by the display unit based upon the operation signals output from the operating unit.

According to the 15th aspect of the invention, in the illuminating device for photographing according to the 14th aspect, it is preferred that the display contents displayed by the display unit indicate the illumination pattern.

According to the 16th aspect of the invention, in the illuminating device for photographing according to the 14th aspect, it is preferred that: there is further provided a storage unit in which sets of information each indicating one of a plurality of illumination patterns are stored; and the light emission control unit performs setting for the plurality of light emitting elements so as to achieve an illumination pattern corresponding to a set of information read out from the storage unit.

According to the 17th aspect of the invention, in the illuminating device for photographing according to the 14th aspect, it is preferred that there is further provided an illumination pattern altering unit that alters the illumination pattern in response to an operation signal output from the operating unit.

According to the 18th aspect of the invention, an illuminating device for photographing comprises: an illuminating unit having a plurality of current-controlled light emitting elements, which illuminates a subject with light emitted from the plurality of light emitting elements; and an illumination control unit that implements on/off control for the plurality of light emitting elements in response to a signal indicating an illuminating angle of the illuminating light provided by the illuminating unit.

According to the 19th aspect of the invention, in the illuminating device for photographing according to the 18th aspect, it is preferred that the illumination control unit narrows the illuminating angle by leaving light emitting elements used to illuminate a peripheral area of a photographic range among the plurality of light emitting elements in an OFF state and widens the illuminating angle by turning on the light emitting elements having been in the OFF state.

According to the 20th aspect of the invention, in the illuminating device for photographing according to the 18th aspect, it is preferred that: a central area within an angle of view is illuminated with light emitting elements disposed in a central area at the illuminating unit and a peripheral area within the angle of view is illuminated with light emitting elements disposed in a peripheral area at the illuminating unit; and the illumination control unit widens the illuminating angle by gradually increasing a number of light emitting elements to be turned on to include the light emitting elements disposed in the peripheral area as well as the light emitting elements disposed in the central area at the illuminating unit.

According to the 21st aspect of the invention, in the illuminating device for photographing according to the 18th aspect, it is preferred that the signal indicating the illuminating angle is generated in correspondence to the angle of view.

According to the 22nd aspect of the invention, in the illuminating device for photographing according to the 19th aspect, it is preferred that at the illuminating unit, the light emitting elements for illuminating the peripheral area of the photographic range are disposed with higher density than the density at which the light emitting elements for illuminating the central area of the photographic range are disposed.

According to the 23rd aspect of the invention, in the illuminating device for photographing according to the 19th aspect, it is preferred that the illumination control unit raises the light emission brightness of the light emitting elements for illuminating the peripheral area of the photographic range relative to the light emission brightness of the light emitting elements for illuminating the central area of the photographic range.

According to the 24th aspect of the invention, in the illuminating device for photographing according to the 19th aspect, it is preferred that at the illuminating unit, the light emitting elements for illuminating the central area of the photographic range are disposed with higher density than the density at which the light emitting elements for illuminating the peripheral area of the photographic range are disposed.

According to the 25th aspect of the invention, in the illuminating device for photographing according to the 19th aspect, it is preferred that the illumination control unit raises the light emission brightness of the light emitting elements for illuminating the central area of the photographic range relative to the light emission brightness of the light emitting elements for illuminating the peripheral area of the photographic range.

According to the 26th aspect of the invention, in the illuminating device for photographing according to the 19th aspect, it is preferred that at the illuminating unit, the light emitting elements are disposed so as to match guide numbers corresponding to the peripheral area and the central area of the photographic range.

According to the 27th aspect of the invention, in the illuminating device for photographing according to the 18th aspect, it is preferred that the light emitting elements are each constituted with a white LED.

According to the 28th aspect of the invention, a camera comprises an illuminating device for photographing according to any of the 13th through the 27th aspects.

DESCRIPTION OF PREFERRED EMBODIMENTS

First Embodiment

Figure 1:
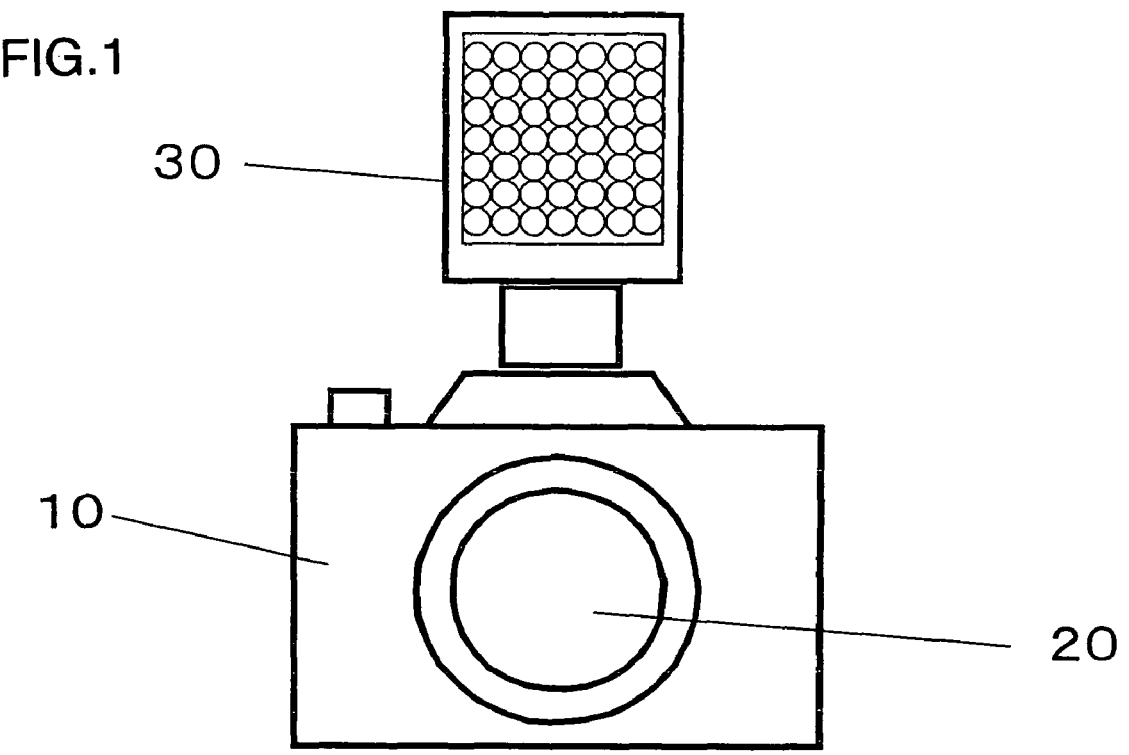
FIG. 1 shows the electronic camera system achieved in a first embodiment of the present invention.

The following is an explanation of a preferred embodiment of the present invention, given in reference to drawings. FIG. 1 shows the electronic camera system achieved in the first embodiment of the present invention. As illustrated in FIG. 1, an interchangeable photographic lenses 20 is mounted at an electronic camera body 10. An illuminating device (or a lighting device) 30 is mounted at an accessory shoe (not shown) of the electronic camera 10.

Figure 2:
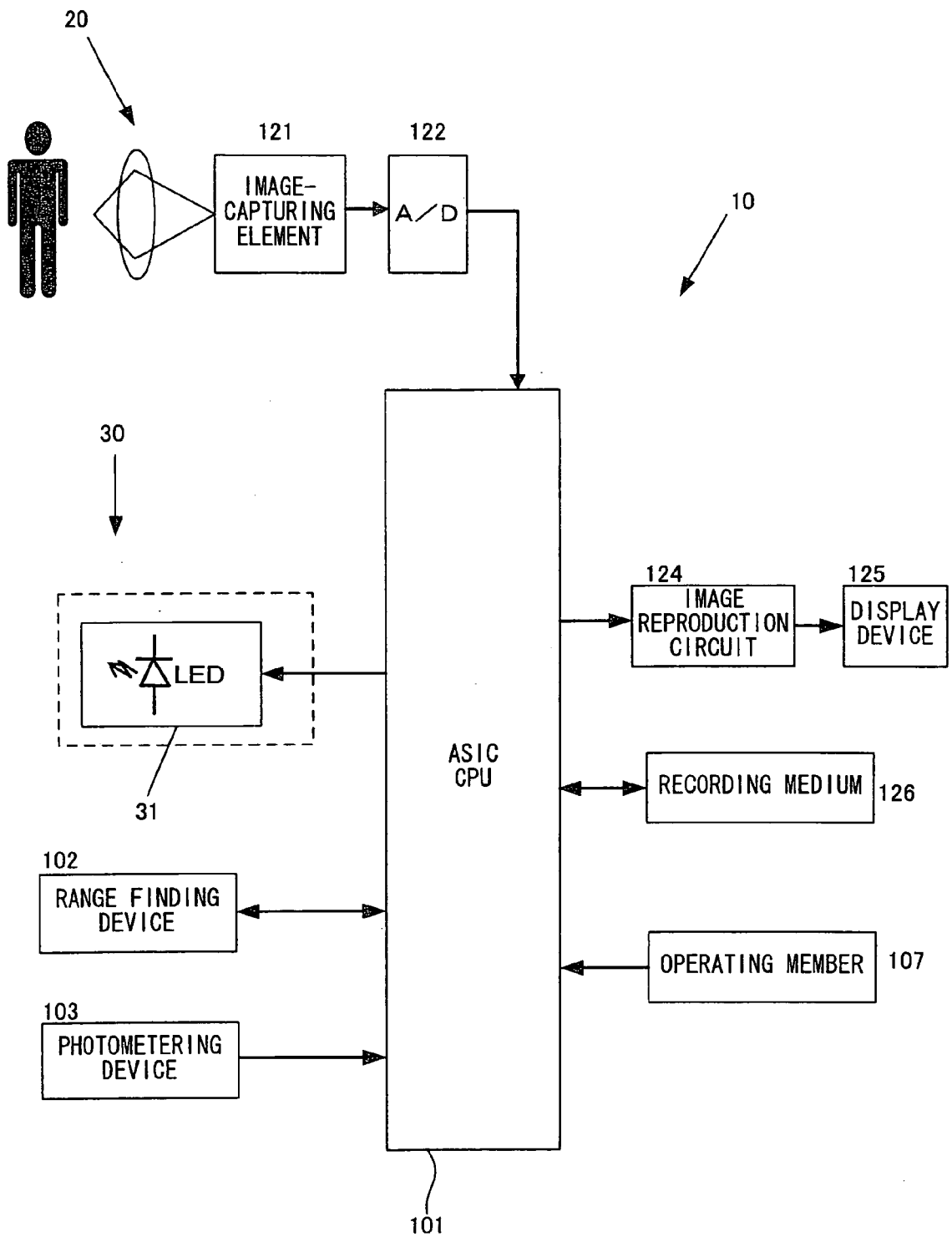
FIG. 2 is a block diagram of the essential structure adopted in the electronic camera in FIG. 1.

FIG. 2 is a block diagram showing the essential structure adopted in the electronic camera system in FIG. 1. The illuminating device 30 shown in FIG. 2 includes a light emission circuit 31 that engages LEDs (light emitting diodes) in light emission. The illuminating device 30 engages in communication with a CPU 101 at the camera body 10 via a communication contact point (not shown) present at the accessory shoe to receive timing signals provided as instructions for the LEDs to start and end light emission, a signal indicating the light emission brightness and the like.

The CPU 101 in the camera body 10 is constituted with an ASIC or the like. The CPU executes specific arithmetic operations by using signals input thereto from various blocks to be detailed later and outputs control signals generated based upon the arithmetic operation results to the individual blocks. In addition, the CPU 101 includes an interface circuit (not shown) which is used to engage in communication with the illuminating device 30. It is to be noted that when a light emission prohibit setting is selected at the camera body 10, the CPU 101 does not output a light emission instruction signal to the illuminating device 30.

A subject light flux having entered the camera body 10 through the photographic lenses 20 is guided to an image-capturing element 121 via a shutter (not shown). The image-capturing element 121 is constituted with a CCD image sensor or the like. The image-capturing element 121 captures an image formed with the subject light flux and outputs image capturing signals to an A/D conversion circuit 122. The A/D conversion circuit 122 converts the analog image capturing signal to a digital signal.

The CPU 101 executes image processing such as white balance processing on image data resulting from the digital conversion and also executes compression processing for compressing the image data having undergone the image processing in a predetermined format, decompression processing for decompressing compressed image data and the like. A recording medium 126 is constituted with a memory card or the like that can be detachably loaded into the electronic camera body 10. Image data having undergone the image processing are recorded into the recording medium 126.

An image reproduction circuit 124 generates data for reproduced image display by using uncompressed image data (image data yet to be compressed or decompressed image data). At a display device 125, which may be constituted with, for instance, a liquid crystal display monitor, images are displayed by using the reproduced image display data.

An operating member 107 includes various operating switches and outputs setting operation signals corresponding to setting operations performed, for instance, to allow/prohibit light emission at the illuminating device 30 to the CPU 101.

A range finding device 102 detects the state of the focal point position adjustment achieved with the photographic lenses 20 and outputs a detection signal to the CPU 101. The CPU 101 outputs a command to a lens drive device (not shown) to drive a focus lens (not shown) in the photographic lenses 20 forward/backward along the optical axis so as to adjust the focal point position of the photographic lenses 20. It is to be noted that the detection signal provided by the range finding device 102 is used as distance information indicating a distance corresponding to the distance (photographing distance) to the main subject.

A photometering device 103 detects the quantity of the subject light through the photographic lenses 20 and outputs a detection signal to the CPU 101. Based upon this detection signal, the CPU 101 calculates the subject brightness and the brightness information resulting from the calculation is then used in exposure calculation.

Figure 3:
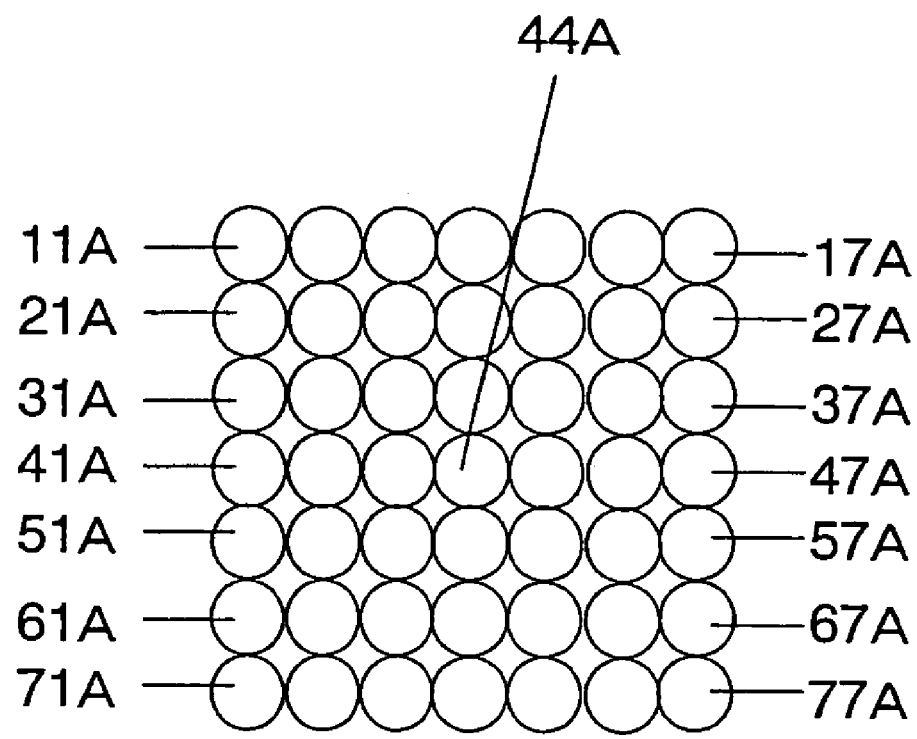
FIG. 3 illustrates the LED array.

The illuminating device 30 turns on LEDs in response to a light emission instruction output by the CPU 101. FIG. 3 shows how the LEDs are arranged in an array, viewed from the light emission window at the illuminating device 30. The illuminating device may include, for instance, a total of 49 white LEDs with seven rows of LEDs arrayed along the horizontal direction and seven columns of LEDs arrayed along the vertical direction. Reference numeral 11A indicates the LED at the left end in the uppermost row and reference numeral 17A indicates the LED at the right end in the uppermost row. Reference 21A indicates the LED at the left end in the second row from the top and reference 27A indicates the LED at the right end in the second row. Likewise, reference numeral 71A indicates the LED at the left end in the lowermost row and reference numeral 77A indicates the LED at the right end in the lowermost row. The LED located at the center is assigned with reference numeral 44A. These 49 LEDs can be individually turned on and off, independently of one another.

Figure 4:
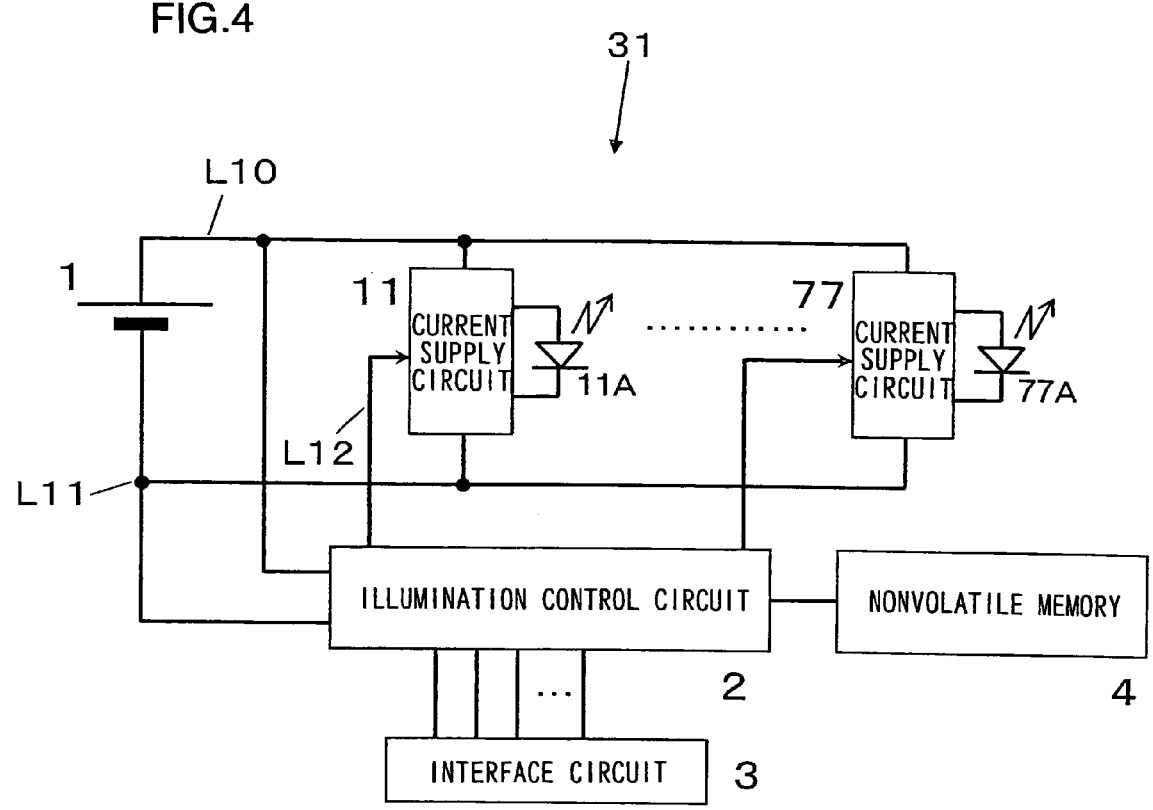
FIG. 4 shows an example of a structure that may be adopted in the light emission circuit.

FIG. 4 shows an example of a structure that may be adopted in the light emission circuit 31 in the illuminating device 30. The light emission circuit 31 in FIG. 4 includes an illumination control circuit 2, current supply circuits 11 to 77, the LEDs 11A to 77A, an interface circuit 3 and a non-volatile memory 4.

The current supply circuits 11 to 77, constituted of 49 integrated circuits or the like for LED drive, are each disposed in correspondence to one of the 49 LEDs 11A to 77A. The current supply circuits 11 to 77 each boost the battery voltage supplied from a battery 1 via power lines L10 and L11 to a specific voltage level (e.g., 3V) needed to drive the corresponding LED 11A to 77A and supply a specific level of electrical current to the LED in response to a command transmitted from the illumination control circuit 2 via a signal line L12. The current supply circuit 11 supplies the drive current to the LED 11A, whereas the current supply circuit 12 supplies the drive current to the LED 12A. Likewise, the current supply circuit 77 supplies the drive current to the LED 77A. The values of the electrical currents to be supplied to the individual LEDs are determined by the illumination control circuit 2.

As is known in the related art, an LED is a current-controlled device that manifests a proportional relation between the drive current and the light emission brightness (light emission intensity) within its rated range. The illumination control circuit 2 is able to individually control the quantities of light emitted from the individual LEDs by controlling the drive currents supplied to the LEDs.

The illumination control circuit 2 determines the values of the electrical currents to be supplied to the individual LEDs based upon the contents of an instruction provided by the CPU 101, and outputs commands to the current supply circuits 11 to 77 instructing them to supply the electrical currents with the determined current values to the LEDs 11A to 77A respectively with specified timing. The illumination control circuit thus controls the timing with which each LED emits light/goes off and the quantity of light emitted from each LED.

In the embodiment, each LED is engaged in continuous light emission at a constant light emission brightness level during an exposure period which corresponds to the shutter speed setting. Since the quantity of light emitted by a given LED is indicated as the product of the light emission brightness and the time length of light emission, the light emission brightness can be determined once the shutter speed is set. The light emission brightness level determined by the CPU 101 as described above is indicated to the illumination control circuit 2.

The relationship between the light emission brightness level at each LED and the electrical current supplied thereto is indicated in data obtained based upon the results of actual measurement, which are stored in advance in the form of a table at the non-volatile memory 4. The illumination control circuit 2 references the table by using the light emission brightness as an argument and determines the level of the electrical current that needs to be supplied to the LED. The illumination control circuit then indicates the current value thus determined to the individual current supply circuits 11 to 77. The current supply circuits 11 to 77 supply electrical current to the corresponding LEDs in response to the command output by the illumination control circuit 2. The battery 1 is the source of power used in the light emission circuit 31 which includes the illumination control circuit 2 and the current supply circuits 11 to 77.

The present invention reduces the extent of unevenness in the illumination provided by the illuminating device 30. The uneven illumination due to the variance among the quantities of illuminating light emitted by the individual LEDs 11A to 77A and the uneven illumination due to the difference between the quantities of illuminating light in the central area and the peripheral area within the angle of view, in particular, are minimized in the first embodiment. It is to be noted that the overall light emission brightness achieved with the illuminating device 30 is controlled (flash control) through exposure calculation so as to achieve optimal exposure.

(Correction of Variance Among the Individual LEDs)

Data are stored into the nonvolatile memory 4 as described below. Once the illuminating device 30 is mounted at a brightness adjusting tool (not shown), the control circuit within the brightness adjusting tool and the illumination control circuit 2 at the illuminating device 30 engage in communication with each other via the interface circuit 3. The control circuit in the brightness adjusting tool outputs a command for the illumination control circuit 2 to sequentially emit light from the LEDs by sequentially supplying electrical currents with values equal to one another (e.g., 70% of the rated current) to the individual LEDs 11A to 77A. In response to the instruction from the brightness adjusting tool, the illumination control circuit 2 outputs commands for the current supply circuits 11 to 77 to sequentially supply the electrical currents achieving the specific level to the LEDs 11A to 77A. As a result, the LEDs are sequentially driven with electrical currents achieving current levels equal to one another.

A light receiving sensor (not shown) is connected to the brightness adjusting tool. The light receiving sensor receives the light sequentially output from the individual LEDs and outputs data (photometric data) indicating the intensities of the light receiving signals to the brightness adjusting tool. The control circuit at the brightness adjusting tool provides the photometric data to the illumination control circuit 2 and issues an instruction for the illumination control circuit 2 to store the photometric data into the nonvolatile memory 4. In response to the instruction from the control circuit at the brightness adjusting tool, the illumination control circuit 2 stores the individual sets of photometric data each corresponding to one of the LEDs 11A to 77A into the non-volatile memory 4. The data thus stored in the nonvolatile memory 4 indicate the light emission brightness levels achieved at the individual LEDs when they are supplied with electrical currents with values equal to one another.

The illumination control circuit 2 then creates table data indicating the relationships between the LED light emission brightness levels and the electrical currents supplied to the individual LEDs by using the photometric data for the LEDs and stores the table data thus created into the nonvolatile memory 4. While a proportional relation manifests between the drive current and the light emission brightness in each LED, LEDs supplied with drive currents with values equal to one another achieve varying levels of light emission brightness, under normal circumstances. In the embodiment, a single set of drive current-light emission brightness table indicating the LED I-L characteristics (drive current-light emission brightness characteristics) is stored into the nonvolatile memory 4 by assuming that a single coefficient of proportion between the drive current and the light emission brightness applies to all the LEDs.

The drive current-light emission brightness table may be created by using test data attached to one of the LEDs 11A to 77A or data obtained by actually measuring one of the LEDs 11A to 77A. However, the drive current-light emission brightness table should not be created by using data of an LED of a type different from the LEDs 11A to 77A.

The sets of photometric data each corresponding to one of the LEDs 11A to 77A and the drive current-light emission brightness table are both stored into the nonvolatile memory 4 while assembling the illuminating device product 30.

With the table data and the photometric data stored in the nonvolatile memory 4 as described above, the illumination control circuit 2 at the illuminating device 30 corrects the variance among the individual LEDs as follows when determining the values of the electrical currents to be supplied to the LEDs by referencing the table during the photographing operation. For instance, the relative ratio of the largest value among the values indicated by the 49 sets of photometric data stored in the nonvolatile memory 4 and the value indicated with the photometric data corresponding to the LED for which the current value is being determined is calculated and the current value read from the table in the non-volatile memory 4 is multiplied by the calculated ratio. For instance, let us assume that the value indicated by the photometric data corresponding to the target LED is 80% of the largest value among all the sets of photometric data. In this case, the relative ratio is calculated to be 1/0.8=1.25. The illumination control circuit 2 multiplies the current value read from the table by 1.25 so as to supply an electrical current that is 25% more than the value in the table data to the target LED. As a result, the electrical current supplied to the LED with a relatively small value indicated by its photometric data (an LED that achieves a lower level of light emission brightness when electrical currents with values equal to one another are supplied to all the LEDs) is increased and thus, the variance of this particular LED is corrected. Through this method, it becomes possible to emit light with all the LEDs achieving brightness levels substantially equal to one another when the LEDs 11A to 77A are all turned on.

(Correction of Variance Between the Central Area and the Peripheral Area)

Figure 5:
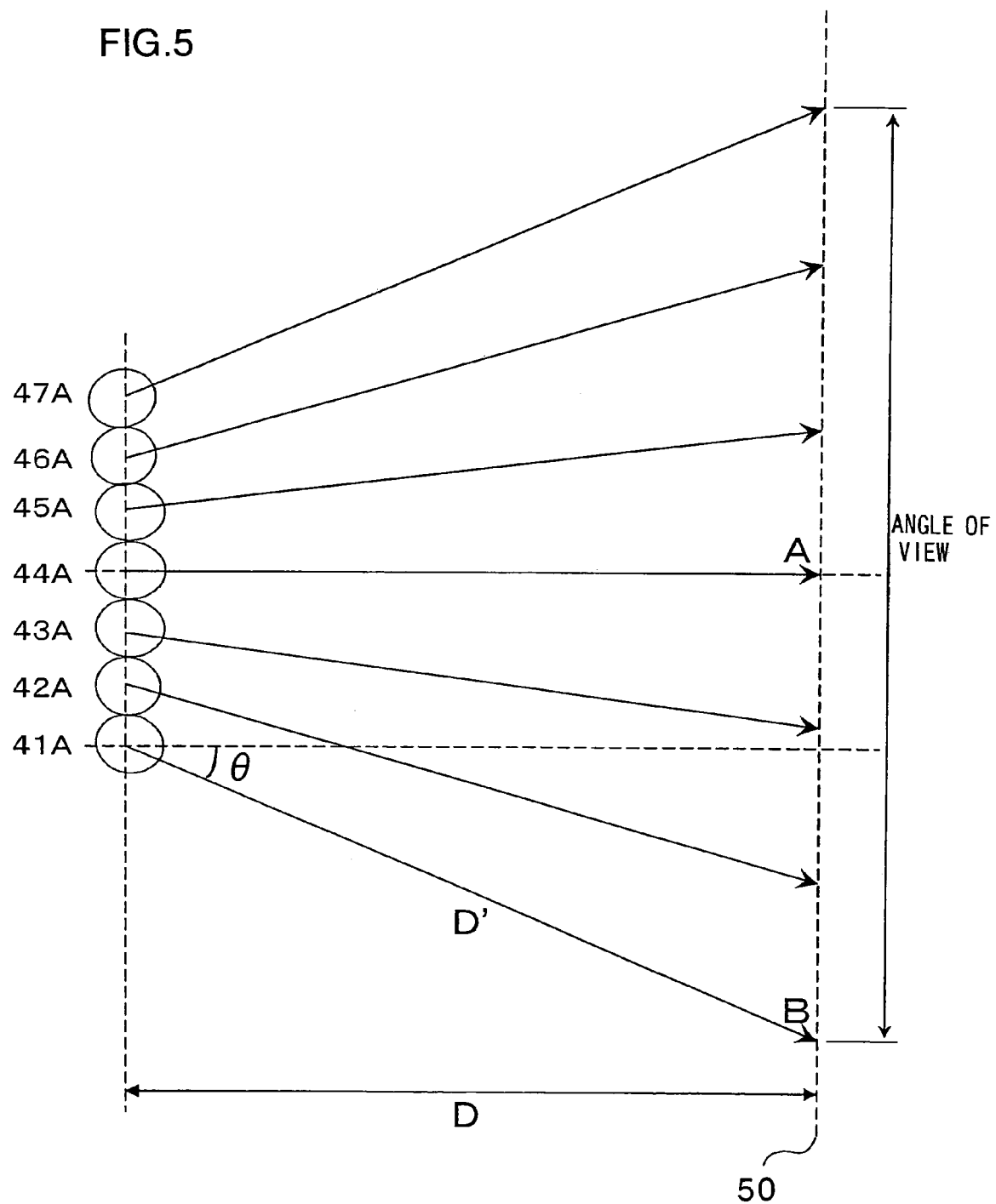
FIG. 5 shows the illuminating ranges of various LED groups.

FIG. 5 illustrates the illuminating ranges of various LED groups at the illuminating device 30. FIG. 5 shows that the illuminating light from the LED group corresponding to the leftmost column viewed from the subject side that includes the LED 41A illuminates the left end area in the angle of view. In addition, the illuminating light from the LED group corresponding to the central column which includes the LED 44A illuminates the central area within the angle of view. The illuminating light from the LED group corresponding to the right end column viewed from the subject side which includes the LED 47A illuminates the right end area in the angle of view.

The illuminating ranges of the LED groups corresponding to the left end column, the central column and the right end column are filled in with the illuminating light from the LED group in the second column from the left, which includes the LED 42A, the illuminating light from the LED group in the third column from the left, which includes the LED 43A, the illuminating light from the LED group in the third column from the right, which includes the LED 45A and the illuminating light from the LED group in the second column from the right, which includes the LED 46A. Thus, the individual LEDs among the LEDs 11A to 77A each illuminate a specific range within the angle of view. While FIG. 5 illustrates the illuminating ranges along the horizontal direction, the same principle applies to the illuminating ranges along the vertical direction.

As FIG. 5 clearly indicates, the subject brightness over the peripheral area within the angle of view is lower than the subject brightness over the central area within the angle of view even when the LEDs 11A to 77A all emit light with the same brightness level. With D representing the photographing distance, the distance D' from the LED 41A to a limit point B of the angle of view along the horizontal direction is expressed as in (1) below.

$$D' = D/\cos\theta \qquad (1)$$

with θ representing the angle formed by a line running parallel to the optical axis of the photographic lenses 20 and the optical axis of the LED 41A (a line running along the center of the illuminating light flux). The photographing distance D corresponds to the illuminating distance achieved with the LED 44A. The distance D' corresponds to the illuminating distance achieved with the LED 41A.

Accordingly, the difference ΔEV between the brightness at the point B and the brightness at a point A at the center can be expressed as in (2) below.

$$\Delta EV = \ln(D'/D)/\ln(\sqrt{2}) \qquad (2)$$

As a specific example, let us assume that a photographic lenses 20 achieving a focal length of 35 mm in conjunction with silver halide 135 mm film is used. In this case, the angle of view ranging to the left and the right to be illuminated is 60°, and thus, θ is 30°. By substituting 30° for θ in expressions (1) and (2) above, ΔEV is calculated to be approximately −0.415. Namely, the brightness at the point B is lower than the brightness at the point A by 0.415 EV.

Accordingly, the LED 41A is caused to emit light with a higher level of light emission brightness than the LED 44A by a factor of $2^{0.415}$ to equalize the brightness levels at the points B and A. By correcting the light emission brightness in this manner for the individual LEDs 11A to 77A, the light emission brightness is adjusted so as to gradually increase the levels of the light emission brightness at LEDs illuminating areas closer to the limit points of the angle of view relative to the light emission brightness at the LED 44A, which illuminates the center of the angle of view. As a result, when the LEDs 11A to 77A are all turned on, the entire photographic field is illuminated with substantially uniform brightness.

As described above, the individual LEDs among the LEDs 11A to 77A each have a specific illuminating range within the angle of view. Namely, the illuminating light axes of the illuminating light fluxes from the LEDs 11A to 77A are all different from one another. In reference to the illuminating light axis of the illuminating light from the LED 44A, which extends parallel to the optical axis of the photographic lens 20, the illuminating light axes corresponding to the LEDs 11A to 77A all form angles different from one another relative to the illuminating light axis of the illuminating light from the LED 44A.

The photographing range at the position distanced by the photographing distance D is defined in correspondence to the photographing distance D and the angle of view. As shown in FIG. 5, the LEDs 11A to 77A all illuminate the photographing range defined in conformance to the photographing distance D and the angle of view. With the photographing range defined over a reference plane 50, the distances between the individual LEDs 11A to 77A and the reference plane 50 taken along the illuminating light axes of the illuminating light fluxes from the LEDs are equivalent to the illuminating distances achieved with the individual LEDs. It is to be noted that the reference plane 50 is perpendicular to the illuminating light axis of the illuminating light from the LED 44A and the optical axis of the photographic lenses 20.

As shown in FIG. 5, the illuminating light axis of the illuminating light from an LED illuminating an area further away from the center of the angle of view and closer to the limit point of angle of view (periphery) forms a greater angle with the illuminating light axis of the illuminating light from the LED 44A, and the illuminating distance of such an LED is greater. For this reason, even when the LEDs 11A to 77A emit light with equal brightness levels, an area further away from the center of the angle of view and closer to a limit point of the angle of view is illuminated less brightly due to the greater illuminating distance.

As are the photometric data described earlier, data indicating the angles formed by the illuminating light axes corresponding to the individual LEDs and the illuminating light axis of the illuminating light from the LED 44A, which illuminates the center of the angle of view, are compiled as a table in correspondence to the individual LEDs 11A to 77A and are stored in the nonvolatile memory 4. These data may be obtained through advance measurement or obtained in correspondence to the design values and are stored into the nonvolatile memory 4. It is to be noted that instead of the angle data indicating the angles formed by the illuminating light axes, data indicating the ratios of the illuminating distance achieved with the LED 44A, which illuminates the center of the angle of view, to the illuminating distances achieved by the other LEDs may be stored in the nonvolatile memory 4.

The illumination control circuit 2 controls the light emission at each LED based upon the data explained above by executing arithmetic operations as indicated in the expressions presented earlier. Namely, the illumination control circuit 2 implements control so as to supply an electrical current with a larger value to an LED with a greater illuminating distance relative to the illuminating distance achieved with the LED 44A, which illuminates the center of the angle of view. In other words, the value of the electrical current to be supplied to a given LED is determined in correspondence to the ratio of the illuminating distance achieved by the LED 44A to the illuminating distance achieved with the LED. This also means that the value of the electrical current to be supplied to each LED is adjusted in correspondence to the area illuminated by the LED.

The brightness correction for the central area and the peripheral area within the angle of view described above is executed after the variance among the individual LEDs is first corrected.

Information indicating the focal length of the photographic lenses 20 is input to the CPU 101 as part of a lens information communication signal (not shown) that also contains the focus lens position information mentioned earlier. Since this lens information communication signal is then transmitted from the CPU 101 to the illuminating device 30 in the structure achieved in the embodiment, the illumination control circuit 2 at the illuminating device 30 is able to obtain the focal length information indicating the focal length of the photographic lens 20. The illumination control circuit 2 executes the processing for correcting the brightness in the central area and the peripheral area within the angle of view in correspondence to the focal length indicated by the most recent focal length information.

The first embodiment described above is now summarized.

(1) The 49 LEDs 11A to 77A constituting light emitting element at the illuminating device 30 used to illuminate different ranges within the angle of view.

(2) Data indicating the light emission brightness levels achieved at the individual LEDs when electrical currents with equal values are supplied to the LEDs 11A to 77A and table data indicating the LED I-L characteristics (drive current-light emission brightness characteristics) are stored into the nonvolatile memory 4. By assuming that a single coefficient of proportion between the drive current and the light emission brightness applies to all the LEDs, only a single set of table data indicating the drive current-light emission brightness characteristics is stored. As a result, since a drive current-light emission brightness table does not need to be prepared in correspondence to each LED, the length of time required for data measurement can be reduced and the nonvolatile memory 4 does not need to have a great storage capacity.

(3) When determining the values of the electrical currents to be supplied to the individual LEDs to turn on the illuminating device 30, the relative ratio of the largest value among the values indicated by the 49 sets of photometric data stored in the nonvolatile memory 4 and the value indicated by the photometric data corresponding to the LED for which the current value is being determined is calculated and the current value read out from the table in the nonvolatile memory 4 is multiplied by the calculated ratio. As a result, an LED with a low level of light emission brightness (low light emission efficiency) that emits light with lower brightness when electrical currents with equal values are supplied to all the LEDs is supplied with a greater electrical current to correct the variance among the light emission brightness levels at the individual LEDs. Since all the LEDs are made to emit light with substantially uniform brightness levels when the LEDs 11A to 77A are all turned on through this correction, the subject can be illuminated uniformly.

(4) Since the variance in the brightness caused by the difference between the illuminating distance D achieved with the LED 44A, which illuminates the center of the angle of view, and the illuminating distance D' of each LED that illuminates the photographic field over a range different from that of the LED 44A is corrected, the light emission brightness is adjusted so that the light emission brightness of an LED that illuminates a range closer to a limit point of the angle of view is increased to a greater degree relative to the light emission brightness of the LED 44A that illuminates the center of the angle of view. As a result, when the LEDs 11A to 77A are all turned on, the entire area within the angle of view is illuminated evenly to achieve substantially uniform brightness.

While a single set of LED drive current-light emission brightness table data is stored in the nonvolatile memory 4, 49 sets of data may be stored each in correspondence to one of the LEDs, instead.

The number of LEDs 11A to 77A constituting the illuminating device 30 does not need to be 49, and instead 30 LEDs or 70 LEDs, for instance, may be used.

The LEDs 11A to 77A constituting the illuminating device 30 may be arranged in a circular array, an elliptical array or a rectangular array instead of the square array adopted in the embodiment described above.

The photometric data and the drive current-light emission brightness table data may be stored into a normal RAM instead of the nonvolatile memory 4. The contents of the data stored in the RAM should be held by using a backup battery.

The illuminating device 30 may include a light receiving sensor to achieve a function as a brightness adjusting tool. In such a case, the light emission brightness of each LED can be measured (self check can be executed) within the illuminating device 30 itself without having to use a separate brightness adjusting tool.

If the illuminating device 30 is capable of executing a self check, the photometric data and the drive current-light emission brightness table data may be stored in a memory (RAM) that is not capable of holding the contents of data stored therein. In this case, a self check should be executed and photometric data and drive current-light emission brightness table data obtained through the self check should be stored into the memory each time the illuminating device 30 is started up.

In order to allow each of the LEDs 11A to 77A to illuminates a specific range within the angle of view different from the illuminating ranges of the other LEDs, the orientations of the individual LEDs should be adjusted so as to vary the directions of light fluxes emitted from the LEDs or an optical member such as a lens or a prism should be disposed on the exit side of the LEDs 11A to 77A to vary the directions of the emitted light fluxes. The angle of view may be set to cover a 120° range along the horizontal direction and a 110° range along the vertical direction for optimal convenience in practical use.

In the explanation provided above, the LED 41A disposed at the left end among the LEDs 11A to 77A illuminates the limit point B of the angle of view at the left end. If the focal length of the photographic lenses 20 is longer, the angle of view becomes smaller than the example described earlier and the illuminating light from the LED 41A (as well as the illuminating light from the LED 47A) advances beyond the range of the angle of view. Under such circumstances, the LEDs illuminating the range beyond the angle of view do not need to be turned on. By adjusting the number of LEDs that are turned on in correspondence to the focal length, the LEDs that would emit superfluous illuminating light to illuminate the range beyond the angle of view are not turned on and thus, the electrical current consumption is reduced.

In the explanation provided above, the data indicating the levels of light emission brightness achieved at the individual LEDs when they are supplied with electrical currents with equal values are stored in the nonvolatile memory 4. Instead, data indicating the values of electrical currents supplied to the individual LEDs so as to emit light from the LEDs with a uniform level of brightness may be stored.

Second Embodiment

Figure 6:
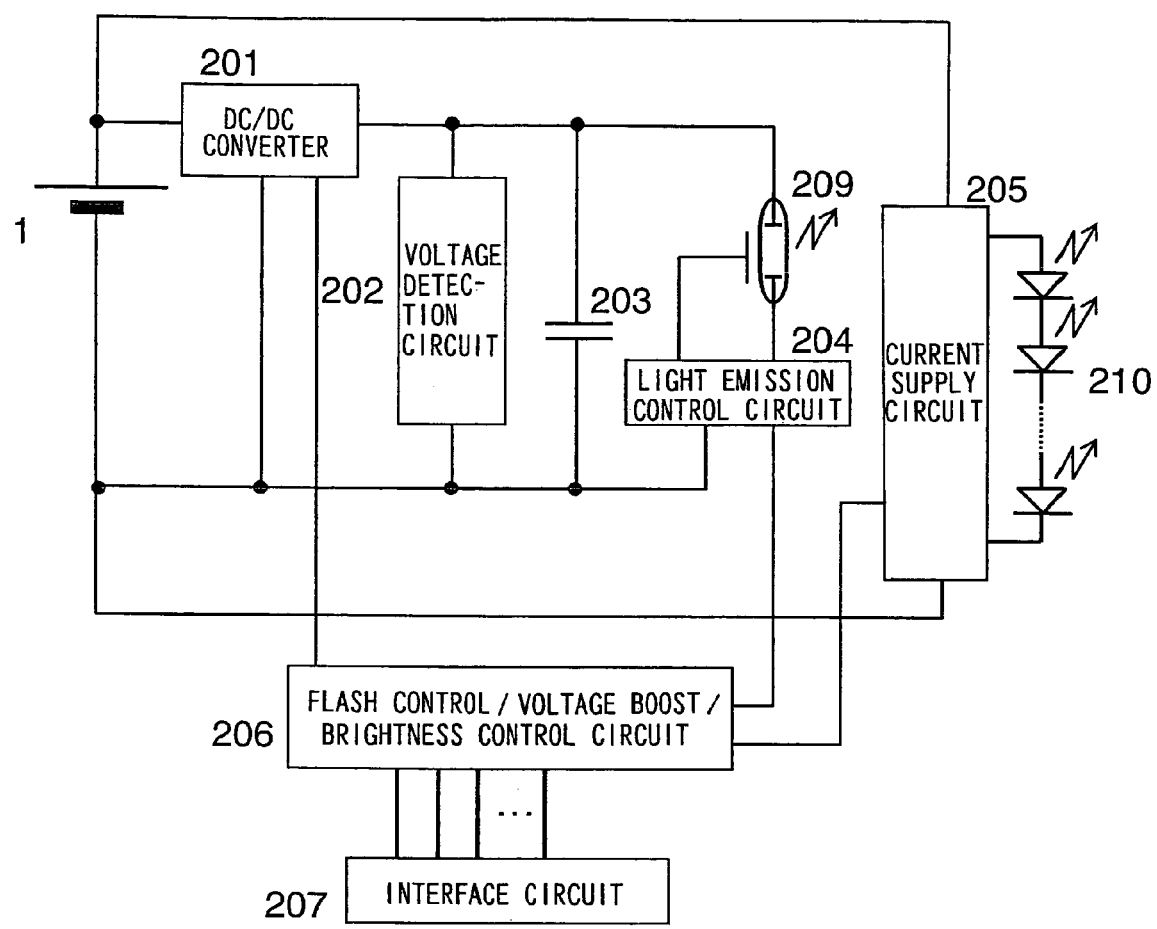
FIG. 6 shows an example of a structure that may be adopted in the light emission circuit in a second embodiment.

Uneven illumination by a discharge type illuminating device such as a xenon (Xe) discharge tube may be corrected through the processing executed to correct the difference in the brightness in the central area and the peripheral area within the angle of view as explained earlier. FIG. 6 shows an example of a structure that may be adopted in the light emission circuit in the illuminating device 30 achieved in the second embodiment. The light emission circuit in FIG. 6 includes a DC/DC converter 201, a voltage detection circuit 202, a main capacitor 203, a light emission control circuit 204, a current supply circuit 205, a flash control/voltage boost/brightness control circuit 206, an interface circuit 207, a xenon tube 209 and a group of LEDs 210.

The DC/DC converter 201 boosts (e.g., to 300V) the voltage supplied from the battery 1 and charges the main capacitor 203. The voltage detection circuit 202 detects the charge voltage at the main capacitor 203 and outputs a detection signal to the flash control/voltage boost/brightness control circuit 206. The light emission control circuit 204, which includes a trigger circuit (not shown), applies a trigger voltage to a trigger electrode at the xenon tube 209 in response to a light emission instruction output from the flash control/voltage boost/brightness control circuit 206. As a result, the electric energy having been stored in the main capacitor 203 is discharged in the xenon tube 209, causing the xenon tube 209 to emit flash light.

The current supply circuit 205 is similar to the current supply circuits 11 to 77 in FIG. 4. The LEDs in the LED group 210 are similar to the LEDs 11A to 77A in FIG. 4. The flash control/voltage boost/brightness control circuit 206 controls the charge of the main capacitor 203, the light emission at the xenon tube 209 and the light emission at the LED group 210.

Figure 7:
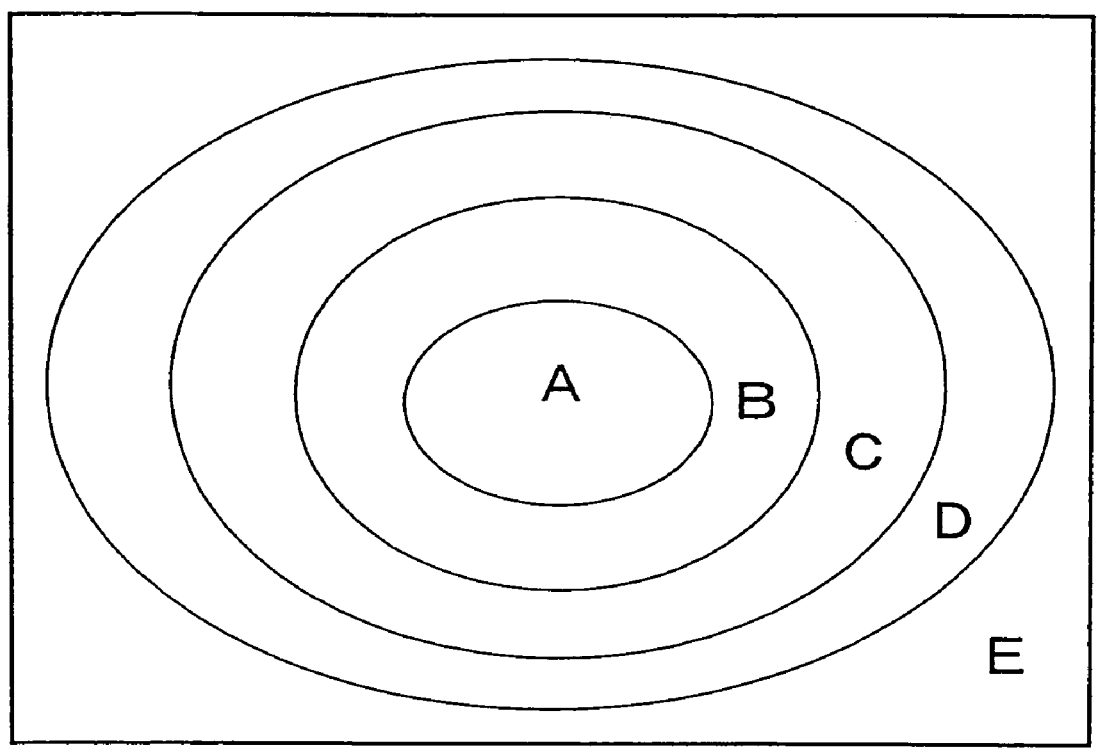
FIG. 7 shows an example of a brightness distribution within the angle of photographic field illuminated with the xenon tube.

FIG. 7 shows an example of a brightness distribution within the angle of view illuminated with the xenon tube 209. The brightness level is the highest over an area A at the center of the image plane and the brightness becomes gradually lower as the distance from the center of the image plane increases. In other words, the brightness decreases in the order; area (A)>area (B)>area (C)>area (D)>area (E). In the embodiment, by emitting light with the LED group 210 in addition to emitting light with the xenon tube 209 (by using the xenon tube and the LEDs in combination), the brightness levels in the areas D and E are boosted closer to the brightness in the areas A and B so as to reduce the extent of uneven illumination. For instance, if the difference between the average brightness in the areas A and B and the average brightness in the areas D and E exceeds a predetermined value, ON control is implemented for the LED group 210 so as to mainly illuminate the areas D and E. When the illuminating angle of the xenon tube 209 is set on the wide side (to illuminate the photographic field of a wide angle lens), the difference in the brightness tends to exceed the predetermined value.

Figure 8:
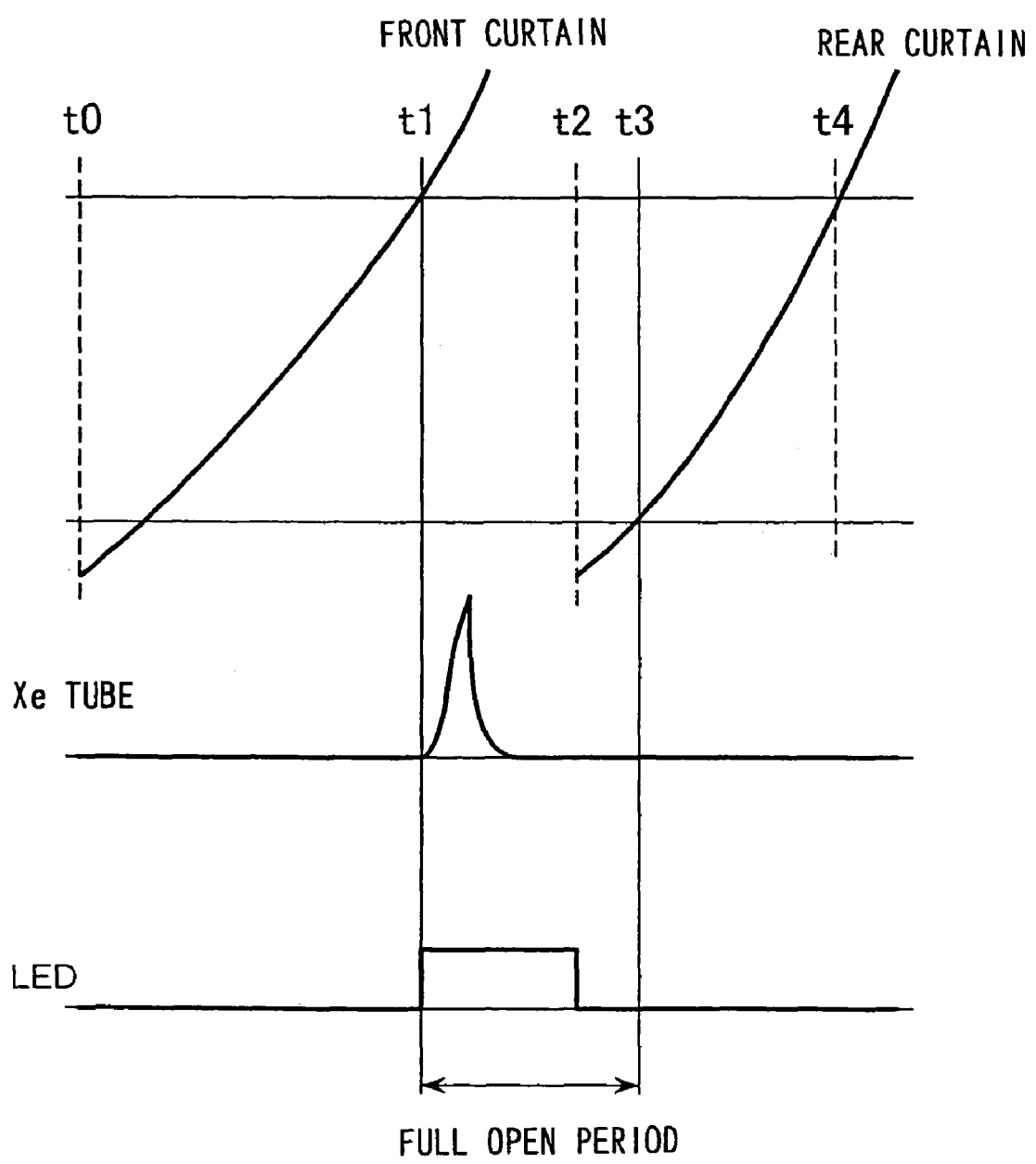
FIG. 8 shows the relationship among the timing with which the shutter is released at the camera body, the timing with which light is emitted from the xenon tube and the timing with which light is emitted from the LED groups.

FIG. 8 is a chart illustrating the relationship among the timing with which the shutter front curtain and the shutter rear curtain constituting the shutter (not shown) at the camera body 10 are individually opened, the timing with which the shutter curtains are individually closed, the timing with which light is emitted with the xenon tube 209 and the timing with which light is emitted from the LED group 210. As a shutter release operation is performed at the camera body 10, the CPU 101 engages the photographing sequence mechanism (not shown) at the camera body 10 to start a photographing operation. In response, the shutter front curtain starts running along the opening direction at a time point t0 in FIG. 8, and the shutter front curtain opens the aperture (not shown) at a time point t1.

When the shutter speed is equal to or lower than the synchronization speed, the length of time (full-open period) elapsing between the time point t1 at which the aperture becomes open and a time point t3 at which the shutter rear curtain having started running at a time point t2 starts to close the aperture is greater than the length of time (set in the order of 1/1000 sec) over which flash light is emitted with the xenon tube 209. The CPU 101 transmits to the flash control/voltage boost/brightness control circuit 206 at the illuminating device 30 a signal (a so-called X contact point signal) constituting a light emission start instruction for the xenon tube 209 to start emitting light following the time point t1 so as to end the flash light emission before the time point t3.

Upon receiving the light emission start instruction signal the flash control/voltage boost/brightness control circuit 206 outputs a command for the light emission control circuit 204 to engage the xenon tube 209 in a flash light emission and also outputs a command for the current supply circuit 205 to enable the LED group 210 to emit light over a specific length of time. Data indicating the light emission brightness levels (i.e., the values of the electrical currents supplied to the LEDs) to be achieved at the individual LEDs constituting the LED group 210 are stored in advance in the nonvolatile memory (not shown).

Light can be continuously emitted with the LED group 210 over a longer period of time than with the xenon tube 309. Accordingly, even if the light emission brightness of the LED group 210 is lower than the light emission brightness of the xenon tube 209, the time integral values indicating the brightness levels over the peripheral area in the angle of view can be increased by allowing the LED group 210 to emit light over a longer period of time than the length of time over which flash light is emitted with the xenon tube 209. However, the length of time over which light is emitted from the LED group should not be greater than the length of time over which the shutter remains in the full open state.

Data obtained based upon actual measurements, which indicate the relationship between the light emission brightness (i.e., the value of the supplied electrical current) that each LED needs to achieve and the length of time over which light needs to be emitted (i.e., the length of time over which the current needs to be supplied) in order to correct the uneven illumination attributable to the xenon tube 209, are stored in the form of a table in the nonvolatile memory (not shown). The flash control/voltage boost/brightness control circuit 206 references the table by using the light emission brightness of the xenon tube 209 to determine the values of the electrical currents needed to be supplied and the lengths of time over which the electrical currents need to be supplied in order to reduce the extent of uneven illumination, and issues an instruction for the current supply circuit 205 to turn on the individual LEDs.

As shown in FIG. 8, when a predetermined length of time elapses after the shutter front curtain opens the aperture (at the time point t1), the photographing sequence mechanism causes the shutter rear curtain to start running along the aperture closing direction at the time point t2. The predetermined length of time is set in correspondence to the shutter speed.

At a time point t4, the shutter rear curtain closes the aperture. Thus, during the period of time elapsing between the time point t1 and the time point t3 over which the aperture remains open (the full open period), the xenon tube 209 emits flash light and the LED group 210 emits light for the predetermined length of time to illuminate the main subject.

A plurality of sets of data are stored in the nonvolatile memory in correspondence to varying focal lengths of the photographic lenses 20 and used to minimize the extent of uneven illumination. When a wide angle lens with a small focal length is used, the brightness distribution within the angle of view tends to show a significant discrepancy between the central area and the peripheral area. In contrast, when the focal length is great, only a small difference manifests between the brightness level in the central area and the brightness level in the peripheral area within the angle of view. For this reason, it is desirable to store in the nonvolatile memory (not shown) a plurality of sets of data each in correspondence to a specific focal length so as to reduce the extent of uneven illumination in an optimal manner at any given focal length by adjusting the pattern with which light is emitted at the LED group 210 in correspondence to the focal length of the photographic lenses 20 being used.

In the second embodiment described above, in which the illuminating device includes the xenon tube 209 and the LED group 210 both used for light emission and the uneven brightness attributable to the illuminating light provided by the xenon tube 209 is corrected by using the illuminating light provided by the LED group 210, the light emission brightness is adjusted so that an LED illuminating an area closer to a limit point of the angle of view achieves a higher level of light emission brightness relative to the light emission brightness achieved with the LED 44A used to illuminate the center of the angle of view. As a result, even illumination achieving substantially uniform brightness within the entire angle of view is assured. This embodiment is particularly effective if adopted with a xenon tube 209 having a variable illuminating angle since a significant difference between the brightness level in the central area and the brightness level in the peripheral area tends to occur readily when the illuminating angle of the xenon tube 209 is set on the wide side in correspondence to the focal length of the photographic lens 20.

It is to be noted that the flash control/voltage boost/brightness control circuit 206 should prohibit light emission at the xenon tube 209 and the light should be emitted with the LED group 210 alone if at least one of the following conditions exists: the photographing distance (indicated by the distance information provided by the range finding device 102) to the main subject is equal to or less than a predetermined value; the sensitivity (including the image capturing sensitivity and the ISO sensitivity) is set to a level higher than a predetermined sensitivity level; and the aperture value is set further toward the open side relative to a predetermined value. Since only a small quantity of light needs to be emitted under the conditions described above, overexposure tends to occur readily if light is also emitted with the xenon tube 209. Accordingly, light should be emitted with the LED group 210 alone to prevent such overexposure.

It is to be noted that the term "light emitting module" may be used to refer to individual LEDs. A light emitting module may be constituted with a single LED as in the embodiment, or it may be constituted with a plurality of LEDs adjusted to illuminate a single illuminating range.

Third Embodiment

Figure 9:
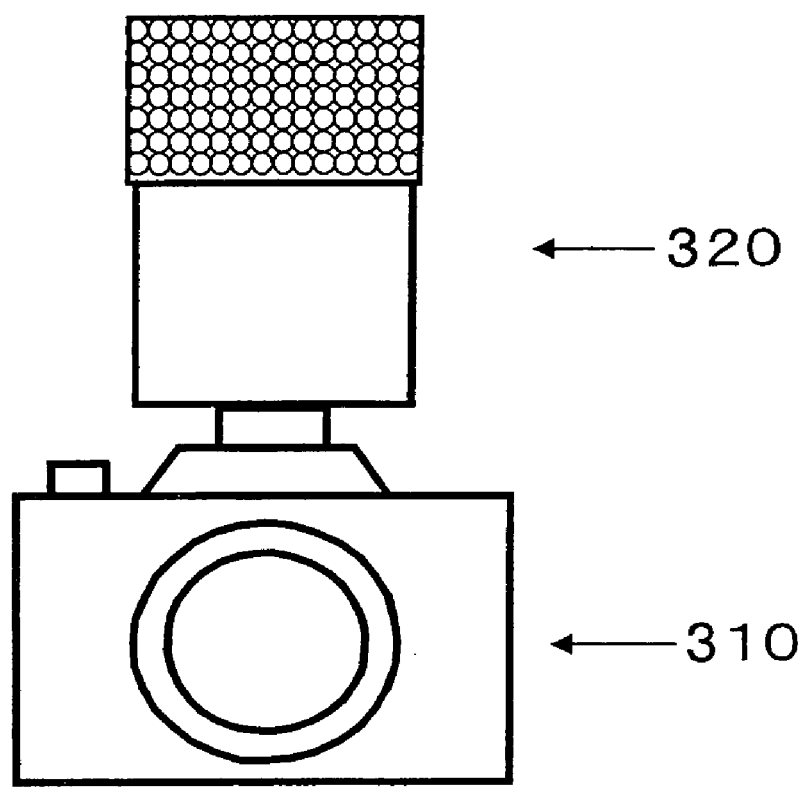
FIG. 9 illustrates a camera system that includes the illuminating device achieved in a third embodiment of the present invention.

FIG. 9 shows a camera system that includes the illuminating device achieved in the third embodiment of the present invention. As shown in FIG. 9, an illuminating device 320 is mounted at an accessory shoe (not shown) of a camera 310.

Figure 10:
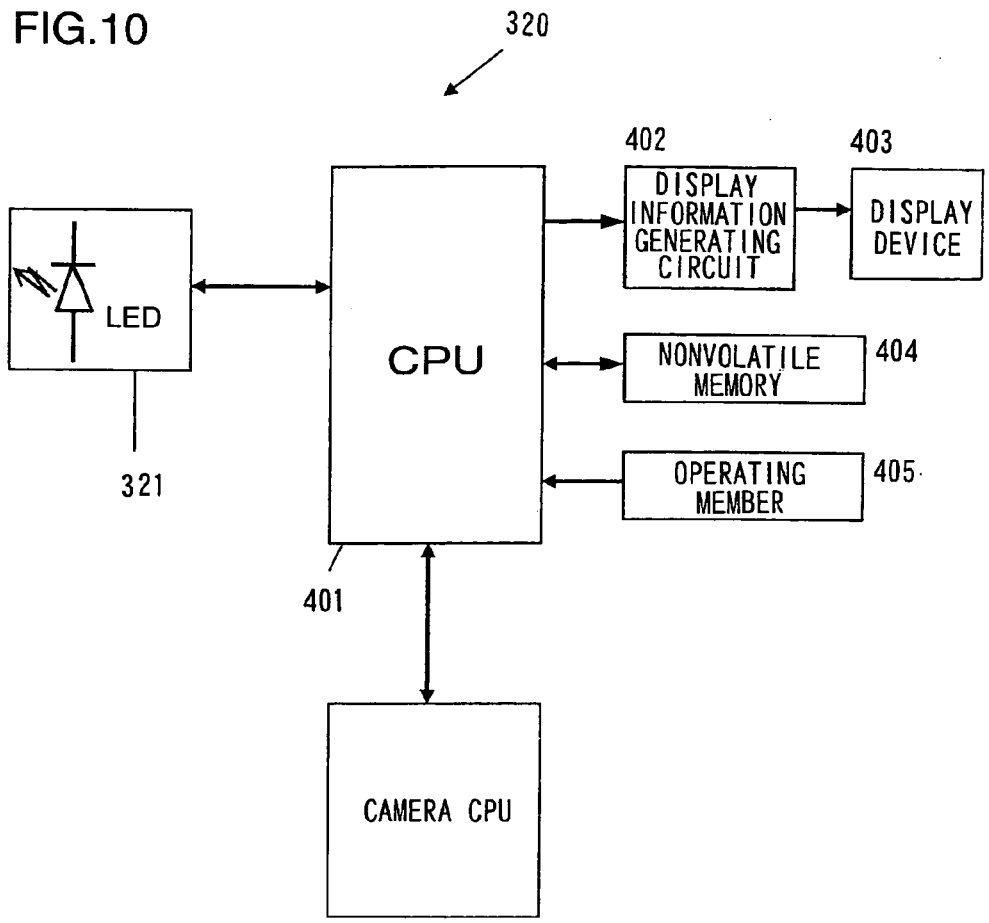
FIG. 10 is a block diagram of the essential structure adopted in the illuminating device.

FIG. 10 is a block diagram of the essential structure adopted in the illuminating device 320. The illuminating device 320 includes a CPU 401, a display information generating circuit 402, a display device 403, a nonvolatile memory 404, an operating member 405 and a light emission circuit 321 that engages LEDs (light emitting diodes) in light emission.

The CPU 401 is constituted with an ASIC or the like. The CPU 401 executes specific arithmetic operations by using signals input thereto from various blocks and outputs control signals generated based upon the arithmetic operation results to the individual blocks. In addition, the CPU 401 includes an interface circuit (not shown) which is used to engage in communication with a CPU on the camera side. Timing signals instructing the LEDs to start and end light emission, a signal indicating the light emission brightness and the like are transmitted from the camera CPU.

In response to a command issued by the CPU 401, the display information generating circuit 402 generates information to be displayed at the display device 403. The display information includes, for instance, illumination pattern setting information indicating the illumination pattern to be achieved with the illuminating device 320. The illumination pattern is to be described in detail later. At the display device 403, constituted with a liquid crystal display panel or the like, the display information generated by the display information generating circuit 402 is displayed.

The nonvolatile memory 404 adopts a structure that allows it to retain the memory contents even when the power switch (not shown) of the illuminating device 320 is turned off. Data indicating the relationship between the LED light emission brightness and the supplied currents, data indicating the current illumination pattern setting and the like are stored in the nonvolatile memory 404.

The operating member 405 includes operating switches such as a four-way switches to be detailed later and outputs an operation signal corresponding to, for instance, a setting operation performed to set a specific illumination pattern at the illuminating device 320 to the CPU 401.

Figure 11:
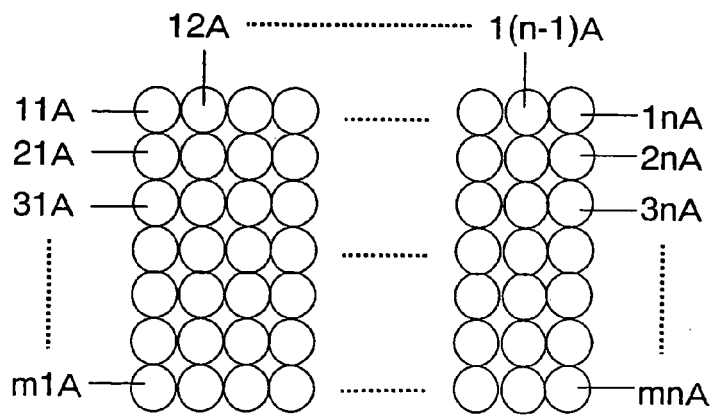
FIG. 11 shows the LED array viewed from the light emission window of the illuminating device.

Upon receiving a light emission instruction from the camera CPU, the CPU 401 turns on the LEDs at the light emission circuit 321. FIG. 11 shows the arrangement of the LEDs viewed from the light emission window of the illuminating device 320. There may be a total of, for instance, (m×n) white LEDs arranged over m rows and n columns. Reference numeral 11A indicates the LED at the left end in the uppermost row whereas reference numeral 1$n$A indicates the LED at the right end in the uppermost row. Reference numeral 21A indicates the LED at the left end in the second row from the top, whereas reference numeral 2$n$A indicates the LED at the right end in the second row. Likewise, reference numeral m1A indicates the LED at the left end in the lowermost row, whereas reference numeral mnA indicates the LED at the right end in the lowermost row. The brightness levels of the (m×n) LEDs can be adjusted independently of one another and the LEDs can be individually turned on and off.

Figure 12:
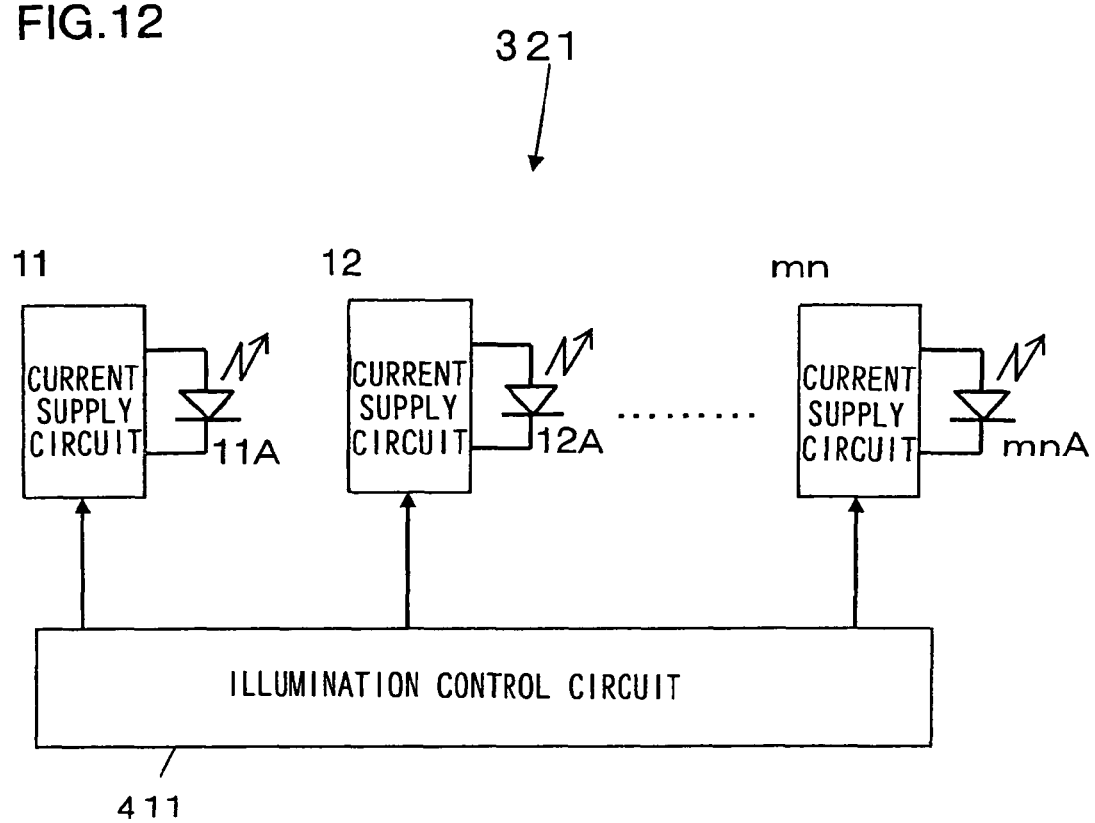
FIG. 12 shows an example of a structure that may be adopted in the light emission circuit.

FIG. 12 shows an example of the structure that may be adopted in the light emission circuit 321. The light emission circuit 321 in FIG. 12 includes an illumination control circuit 411, current supply circuits 11 to mn and the LEDs 11A to mnA.

The current supply circuits 11 to mn, each constituted of an integrated circuit or the like for LED drive, are each disposed in correspondence to one of the (m×n) LEDs 11A to mnA. The current supply circuits 11 to mn each boost the battery voltage supplied from a battery (not shown) to a specific voltage level (e.g., 3V) needed to drive the corresponding LED 11A to mnA and supply a specific level of electrical current to the LED in response to a command transmitted from the illumination control circuit 411. The current supply circuit 11 supplies the drive current to the LED 11A, whereas the current supply circuit 12 supplies the drive current to the LED 12A. Likewise, the current supply circuit mn supplies the drive current to the LED mnA. The values of the electrical currents to be supplied to the individual LEDs are determined by the CPU 401 (see FIG. 10).

As is known in the related art, an LED is a current-controlled device that manifests a proportional relation between the drive current and the light emission brightness (light emission intensity) within its rated range. The illumination control circuit 411 is able to individually control the quantities of light emitted from the individual LEDs by controlling the drive currents supplied to the LEDs.

The illumination control circuit 411 outputs commands to the current supply circuits 11 to mn instructing them to supply the electrical currents with the current values which are determined based upon instructions provided by the CPU 401 to the LEDs 11A to mnA respectively with specified timing. The illumination control circuit thus controls the timing with which each LED emits light/goes off and the quantity of light emitted from each LED.

In the embodiment, each LED is engaged in continuous light emission at a constant light emission brightness level during an exposure period which corresponds to the shutter speed setting. Since the quantity of light emitted by a given LED is indicated as the product of the light emission brightness and the time length of light emission, the light emission brightness can be determined once the shutter speed is set. Upon obtaining light emission brightness information indicating the light emission brightness determined in correspondence to the shutter speed from the camera CPU, the CPU 401 determines the value of the electrical current that needs to be supplied to each LED and indicates the electrical current value thus determined to the illumination control circuit 411.

The relationship between the light emission brightness level at each LED and the electrical current supplied thereto is indicated in data obtained based upon the results of actual measurements, which are stored in advance in the form of a table at the non-volatile memory 404. The CPU 401 references the table by using the light emission brightness as an argument and determines the level of the electrical current that needs to be supplied. The illumination control circuit then indicates the current values thus determined to the individual current supply circuits 11 to mn via the illumination control circuit 411. The current supply circuits 11 to mn supply the electrical currents to the corresponding LEDs in response to a command output by the illumination control circuit 411.

(Data Used to Correct Variance Among the Individual LEDs)

(Data Used to Correct Variance Between the Central Area and the Peripheral Area)

Data used to correct the variance among the individual LEDs and data used to correct a variance between the central area and the peripheral area are stored in the nonvolatile memory 404. These data may be stored while the illuminating device 320 is mounted at a brightness adjusting tool (not shown), for instance. The data used to correct the variance among the individual LEDs and the data used to correct the variance between the central area and the peripheral area are obtained, stored in memory and used in the correction processing in a manner similar to that having been explained in reference to the first embodiment. Accordingly, assuming that the explanation of the first embodiment will suffice, a repeated explanation is omitted. However, the third embodiment differs from the first embodiment in that the LEDs are arrayed over m rows and n columns.

In the third embodiment, intentionally uneven illumination such as spot illumination is achieved with the illuminating device 320 described above. In the third embodiment, the LEDs 11A to mnA are selectively used to illuminate the subject. It is to be noted that the overall light emission brightness achieved with the illuminating device 320 is controlled (brightness controlled) through exposure calculation so as to achieve optimal exposure.

Figure 13:
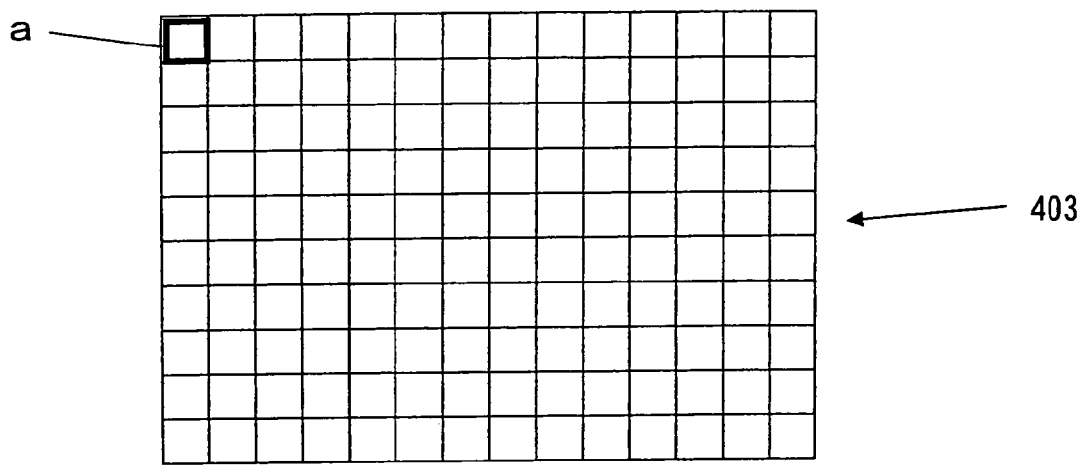
FIG. 13 illustrates the display device and the operating member disposed at the illuminating device.
Figure 13:
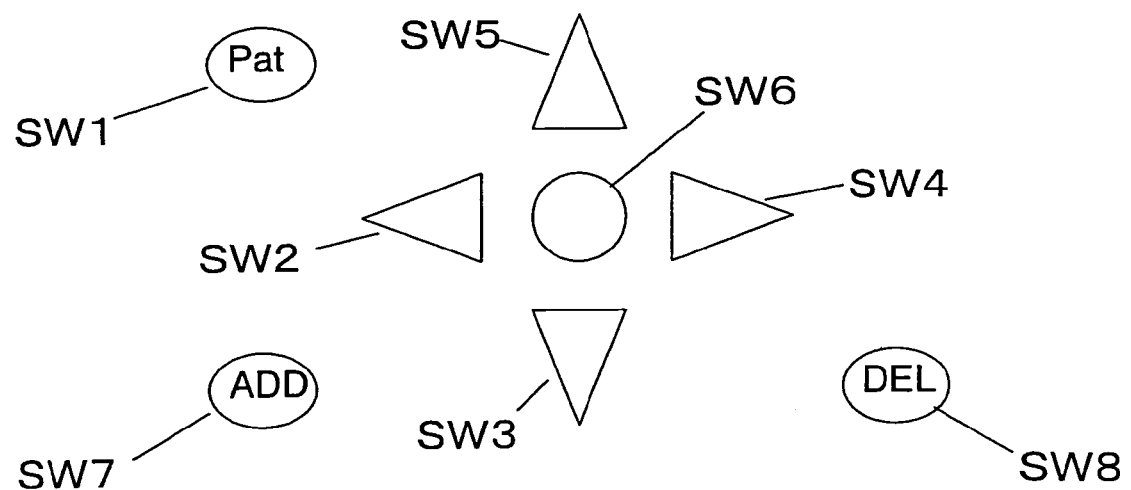

FIG. 13 shows the display device 403 and the operating member 405 disposed at the rear of the illuminating device 320. At the display device 403, m (rows)×n (columns) squares defined by grid lines each in correspondence to one of the (m×n) LEDs can be displayed.

Four-way switches SW2 to SW5, a pattern setting switch SW1, an OK switch SW6, an ADD switch SW7 and a DELETE switch SW8 constitute the operating member 405.

As the operator presses the pattern setting switch SW1, the CPU 401 engages the display device 403 to bring up a display corresponding to illumination pattern data stored in advance in the nonvolatile memory 404.

Figure 14:
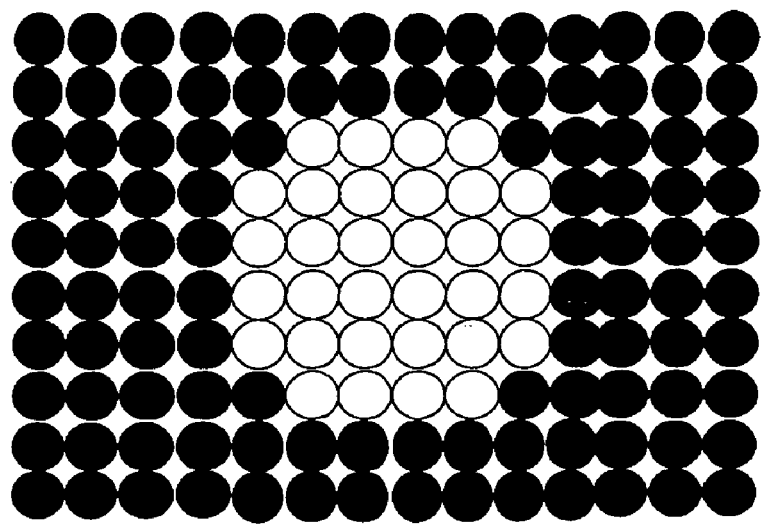
FIG. 14 shows an example of an illuminating pattern display.

FIG. 14 presents an example of a display indicating a circular spot illumination pattern. In correspondence to the individual grid squares, LEDs to emit light are indicated as white circles and LEDs that are not to emit light are indicated as black circles. Each time the pattern setting switch SW1 is operated, the CPU 401 reads out data indicating a different illumination pattern from the nonvolatile memory 404 and displays the illumination pattern corresponding to the data having been read out by cyclically switching to a triangular spot illumination pattern such as that shown in FIG. 15, a star-shaped spot illumination pattern (not shown), a heart-shaped spot illumination pattern (not shown) and the like, for instance. The illumination patterns that may be read out from the nonvolatile memory include an illumination pattern achieved by turning on all the LEDs and an illumination pattern that can be freely customized by the operator.

As the operator presses down the OK switch SW6, the CPU 401 registers the illumination pattern setting of the illumination pattern currently on display at the display device 403 as the selected illumination pattern for the light emission. Upon receiving a light emission instruction from the camera CPU in this state, the CPU 401 turns on only the LEDs indicated in the registered illumination pattern.

Now, an explanation is given on an illumination pattern customized by the operator. As the pattern setting switch SW1 is repeatedly operated, the CPU 401 brings up a custom setting screen on display at the display device 403. The custom setting screen is on display at the display device 403 in FIG. 13. The initial position on the cursor "a" is at the upper left corner of the screen at the display device 403. The cursor may be indicated by, for instance, flashing the bold lines enclosing the grid square. The cursor moves as the operator presses down the four-way switches SW2 to SW5. The CPU 401 moves the cursor to the next square to the right from the current cursor position on the display if the right-direction switch SW4 is pressed. The CPU 401 moves the cursor to the next square below the current cursor position on the display if the down-direction switch SW3 is pressed down.

As the operator presses the OK switch SW6, the CPU 401 switches the cursor display from the flashing state to a steady-on state as a confirmation. If any of the four-way switches SW2 to SW5 is pressed after the confirmation, a new flashing cursor is generated and is made to move from the confirmed position in the direction corresponding to the direction indicated by the four-way switch having been pressed. It is to be noted that the steady-on display is sustained at each confirmed position. If the OK switch SW6 is pressed without generating a new cursor (i.e., if the OK switch SW6 is pressed twice in succession), the CPU 401 displays the squares at the confirmed positions in the steady-on state as white squares and displays unconfirmed squares as black squares. In addition, the CPU 401 registers the illumination pattern setting of the illumination pattern indicated by the confirmed square positions as the selected illumination pattern for the light emission.

Figure 15:
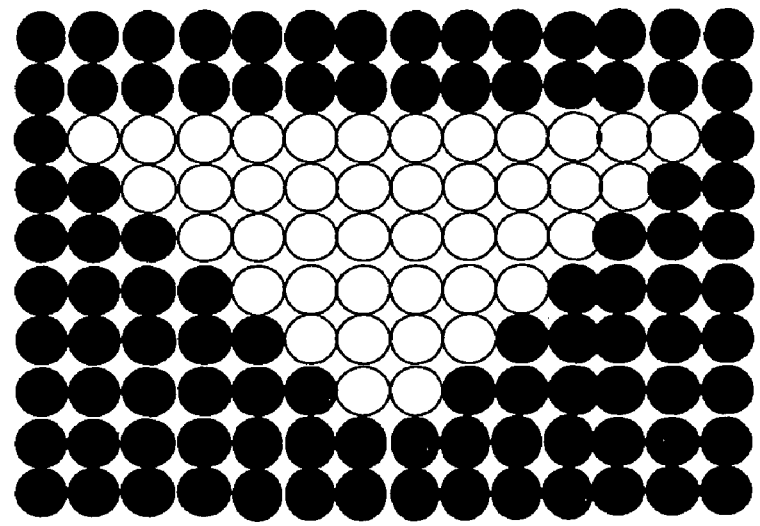
FIG. 15 shows an example of an illuminating pattern display.

As a result, the illumination pattern customized by the operator is displayed at the display device 403 in a manner similar to that with which the illumination patterns in FIGS. 14 and 15 are displayed. Upon receiving a light emission instruction from the camera CPU in this state, the CPU 401 turns on only the LEDs indicated in the custom illumination pattern. When the illumination pattern setting is registered, the data indicating the illumination pattern customized by the operator are stored into the nonvolatile memory 404.

A registered illumination pattern can be modified as described below. The operator presses the ADD switch SW7 while an illumination pattern is on display at the display device 403, as shown in FIG. 14 or FIG. 15, and in response the CPU 401 displays a flashing cursor "a" at the initial position in the screen at the display device 403. The cursor moves as the operator operates the four-way switches SW2 to SW5.

As the operator presses the OK switch SW6, the CPU 401 clears the confirmation of the square at which the flashing cursor is currently set. In addition, the CPU 401 switches the display mode for the cleared square from the white display to the black display. Through this method, the light emission from any LED in the illumination pattern can be canceled.

The operator presses the DELETE switch SW8 while an illumination pattern is on display at the display device 403, as shown in FIG. 14 or FIG. 15, and in response the CPU displays a flashing cursor "a" at the initial position in the screen at the display device 403. The cursor moves as the operator operates the four-way switches SW2 to SW5.

As the operator presses the OK switch SW6, the CPU 401 confirms the square at which the flashing cursor is currently set. The CPU 401 then switches the display mode of the confirmed square from the black display to the white display. As a result, the desired LED can be added in the illumination pattern. The data in the nonvolatile memory 404 are updated with information indicating the alteration made by the operator by canceling the light emission from specific LEDs or adding more LEDs to be engaged in light emission.

The third embodiment described above is now summarized.

(1) The (m×n) LEDs 11A to mnA constituting light emitting elements at the illuminating device 320 illuminate different ranges within the angle of view.

(2) Data indicating the light emission brightness levels achieved at the individual LEDs when electrical currents with equal values are supplied to the LEDs 11A to mnA and table data indicating the LED I-L characteristics (drive current-light emission brightness characteristics) are stored into the nonvolatile memory 404. By assuming that a single coefficient of proportion between the drive current and the light emission brightness applies to all the LEDs, only a single set of table data indicating the drive current-light emission brightness characteristics is stored. As a result, since a drive current-light emission brightness table does not need to be prepared in correspondence to each LED, the length of time required for data measurement can be reduced and the nonvolatile memory 404 does not need to have a great storage capacity.

(3) When determining the values of the electrical currents to be supplied to the individual LEDs to turn on the illuminating device 320, the relative ratio of the largest value among the values indicated by the (m×n) sets of photometric data stored in the nonvolatile memory 404 and the value indicated by the photometric data corresponding to the LED for which the current value is being determined is calculated and the current value read out from the table in the nonvolatile memory 404 is multiplied by the calculated ratio. As a result, an LED with a low level of light emission brightness (low light emission efficiency) that emits light with lower brightness when electrical currents with equal values are supplied to all the LEDs is supplied with a greater electrical current to correct the variance among the light emission brightness levels at the individual LEDs. Since all the LEDs are made to emit light with substantially uniform brightness levels when the LEDs 11A to mnA are all turned on through this correction, the subject can be illuminated uniformly.

(4) Since the variance in the brightness caused by the difference between the illuminating distance D achieved with the LED 1(n/2)A, which illuminates the center of the angle of view, and the illuminating distance D' of each LED that illuminates the photographic field over a range different from that of the LED 1(n/2)A is corrected, the light emission brightness is adjusted so that the light emission brightness of an LED that illuminates a range closer to a limit point of the angle of view is increased to a greater degree relative to the light emission brightness of the LED 1(n/2)A that illuminates the center of the angle of view. As a result, when the LEDs 11A to mnA are all turned on, the entire area within the angle of view is illuminated evenly with substantially uniform brightness.

(5) Intentionally uneven illumination is achieved by illuminating the subject with only some light emitting elements among the (m×n) light emitting elements each used to illuminate a specific range within the angle of view. As a result, a specific illuminating effect desired by the photographer such as spot elimination can be achieved.

(6) Data indicating a plurality of illumination patterns are stored in advance in the nonvolatile memory 404 and the various illumination patterns can be cyclically selected by repeatedly operating the pattern setting switch SW1. Thus, the desired illumination pattern can be selected with ease.

(7) At the display device 403, m (rows)×n (columns) grid squares each corresponding to one of the (m×n) light emitting elements can be displayed with each light emitting element set (confirmed) for light emission displayed as a white display and each light emitting element not set for light emission displayed as a black display. Thus, the photographer can visually ascertain with ease the specific illumination pattern with which light is to be emitted.

As explained earlier in reference to the first embodiment, while a single set of LED drive current-light emission brightness table data is stored in the nonvolatile memory 404, (m×n) sets of data may be stored each in correspondence to one of the LEDs.

The LEDs 11A to mnA constituting the illuminating device 320 may be arranged in a circular array, an elliptical array or a square array instead of the rectangular array adopted in the embodiment described above.

The photometric data and the drive current-light emission brightness table data may be stored into a normal RAM instead of the nonvolatile memory 404. The contents of the data stored in the RAM should be held by using a backup battery.

The illuminating device 320 may include a light receiving sensor to achieve a function as a brightness adjusting tool. In such a case, the light emission brightness of each LED can be measured (self check can be executed) within the illuminating device 320 itself without having to use a separate brightness adjusting tool.

If the illuminating device 320 is capable of executing a self check, the photometric data and the drive current-light emission brightness table data may be stored in a memory (RAM) that is not capable of holding the contents of data stored therein. In this case, a self check should be executed, and photometric data and drive current-light emission brightness table data obtained through the self check should be stored into the memory each time the illuminating device 320 is started up.

In order to allow each of the LEDs 11A to mnA to illuminates a specific range within the angle of view different from the illuminating range of the other LEDs, the orientations of the individual LEDs should be adjusted so as to vary the directions of light fluxes emitted from the LEDs or an optical member such as a lens or a prism should be disposed on the exit side of the LEDs 11A to mnA to vary the directions of the emitted light fluxes. The angle of view may be set to cover a 120° range along the horizontal direction and a 110° range along the vertical direction for optimal convenience in practical use.

In the explanation provided above, the data indicating the levels of light emission brightness achieved at the individual LEDs when they are supplied with electrical currents with equal values are stored in the nonvolatile memory 404. Instead, data indicating the values of electrical currents supplied to the individual LEDs so as to emit light from the LEDs with a uniform level of brightness may be stored.

Fourth Embodiment

In the fourth embodiment, the LEDs selected for light emission among the LEDs 11A to mnA are made to emit light so as to illuminate the subject with intentionally varied levels of brightness. It is to be noted that, as in the third embodiment, the overall light emission brightness achieved with the illuminating device 320 is controlled (brightness control) through exposure calculation so as to achieve optimal exposure.

The OK switch SW6 can be depressed and also can be rotated. As the OK switch SW6 is turned while the cursor is located at a square having been confirmed as explained earlier on the display device 403, the CPU 401 alters the brightness of the white display at the square in correspondence to the extent to which the OK switch has been turned. The display brightness is increased if the OK switch is turned to the right and the display brightness is lowered if the OK switch is turned to the left.

Figure 16:
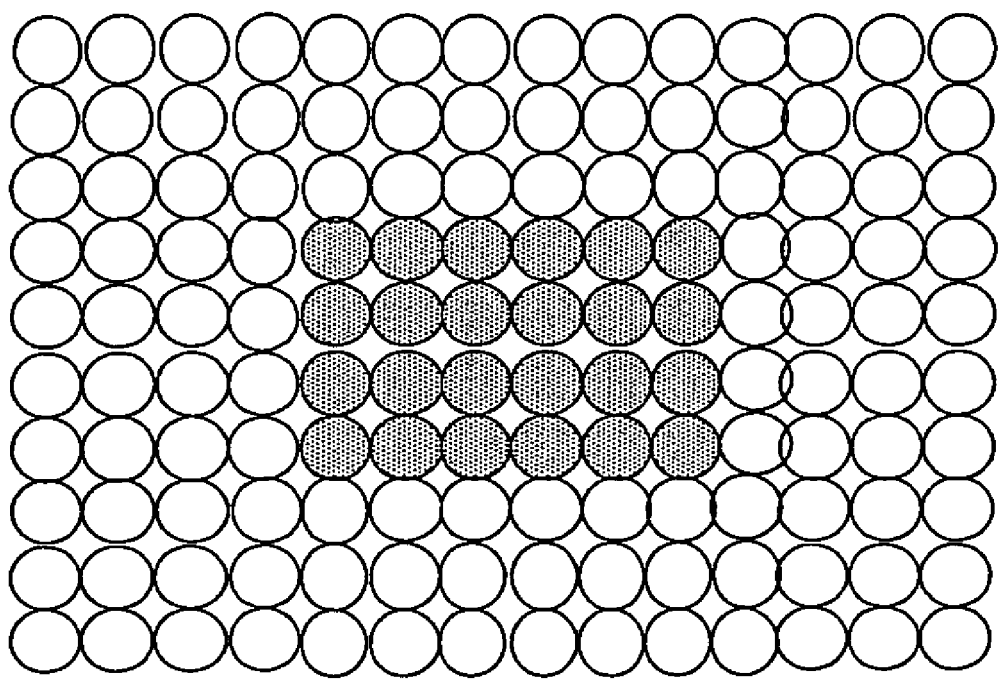
FIG. 16 shows an example of an illuminating pattern display that may be adopted in a fourth embodiment.

If the operator then presses down the OK switch SW6, the CPU 401 confirms the currently selected white display brightness level for the square. If any of the four-way switches SW2 to SW5 is pressed after the confirmation, a new flashing cursor is generated and is made to move from the confirmed position in the direction corresponding to the direction indicated by the four-way switch having been pressed. If the OK switch SW6 is pressed without generating a new cursor (i.e., if the OK switch SW6 is pressed twice in succession), the CPU 401 registers the illumination pattern indicated by the current ON/OFF states of the individual squares as the illumination pattern to be achieved through the light emission. The illumination pattern selected as described above includes brightness information. As a result, any illumination pattern specified by the operator can be brought up on display at the display device 403 as shown in FIG. 16. FIG. 16 shows that the group of LEDs that illuminate the peripheral area within the angle of view is set to achieve a high level of brightness, whereas the group of LEDs that illuminate the central area is set to a low level of brightness. It is to be noted that the LEDs are set to achieve such varying levels of brightness not in order to minimize the extent of nonuniform brightness within the angle of view, but to intentionally induce a variance in the brightness.

In response to a light emission instruction received from the camera CPU in this state, the CPU 401 turns on the LEDs with varying levels of brightness in correspondence to the illumination pattern. Namely, the light emission brightness is adjusted so as to raise the light emission brightness at an LED used to illuminate a range further toward an end of the angle of view relative to the light emission brightness of the LED group used to illuminate the central area within the angle of view.

In the fourth embodiment described above, intentionally uneven illumination is achieved by individually adjusting the levels of brightness to be achieved at the (m×n) light emitting elements used to illuminate specific ranges within the angle of view different from one another. As a result, compared to the third embodiment in which some of the light emitting elements are selectively turn on/off, a more subtle illuminating effect can be achieved. In addition, at the display device 403, m (rows)×n (columns) grid squares each corresponding to one of the (m×n) light emitting elements are displayed and the brightness level of the white display indicating each light emitting element set (confirmed) for light emission is adjusted in correspondence to the light emission brightness to be achieved at the light emitting element. As a result, the photographer can visually ascertain with ease the specific illumination pattern with which light is to be emitted.

If the extent of the variance among the individual LEDs is small enough to be disregarded, the correction for the variance of the brightness levels among the individual LEDs may be omitted.

In addition, if the discrepancy between the brightness level in the central area and the brightness level in the peripheral area within the angle of view is small enough to be disregarded, the correction for the variance in the brightness within the angle of view may be omitted.

The light emitting elements may be constituted with light bulbs instead of LEDs.

While the intentionally uneven illumination is achieved by varying the levels of brightness (low/high) at the individual light emitting elements, desirably uneven illumination may instead be achieved by coloring light emitted by the light emitting elements instead of by lowering or raising the brightness.

Fifth Embodiment

Figure 17:
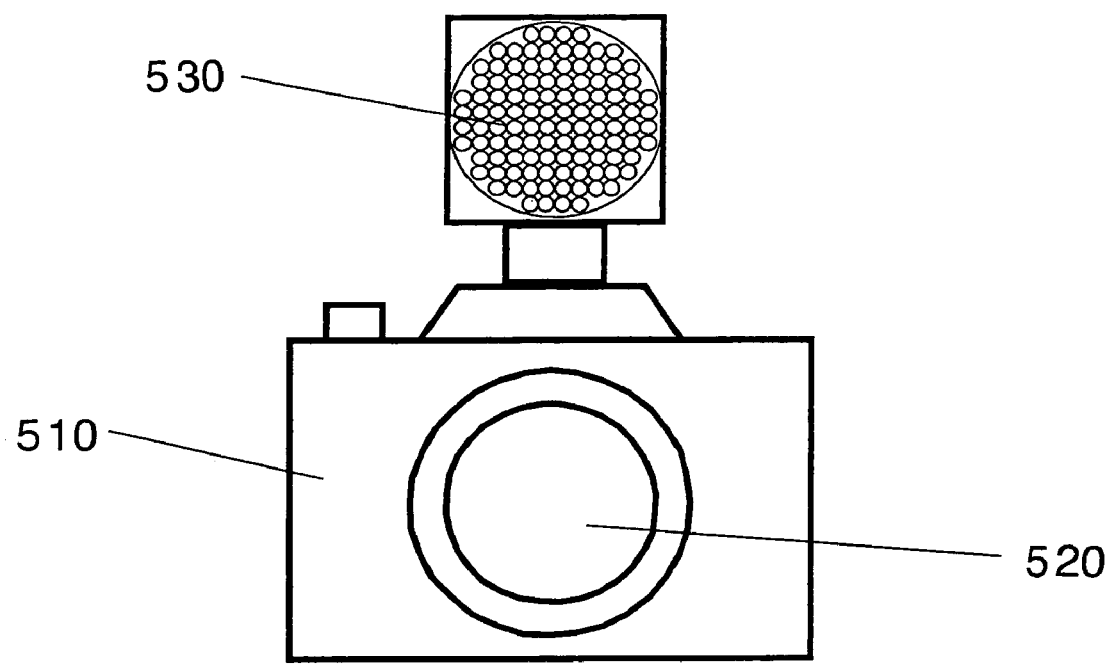
FIG. 17 shows the electronic camera system achieved in a fifth embodiment of the present invention.

FIG. 17 shows the electronic camera system achieved in the fifth embodiment of the present invention. FIG. 17 shows an interchangeable photographic lens 520 mounted at an electronic camera body 510. In addition, an illuminating device 530 is mounted at an accessory shoe (not shown) of the electronic camera 510.

Figure 18:
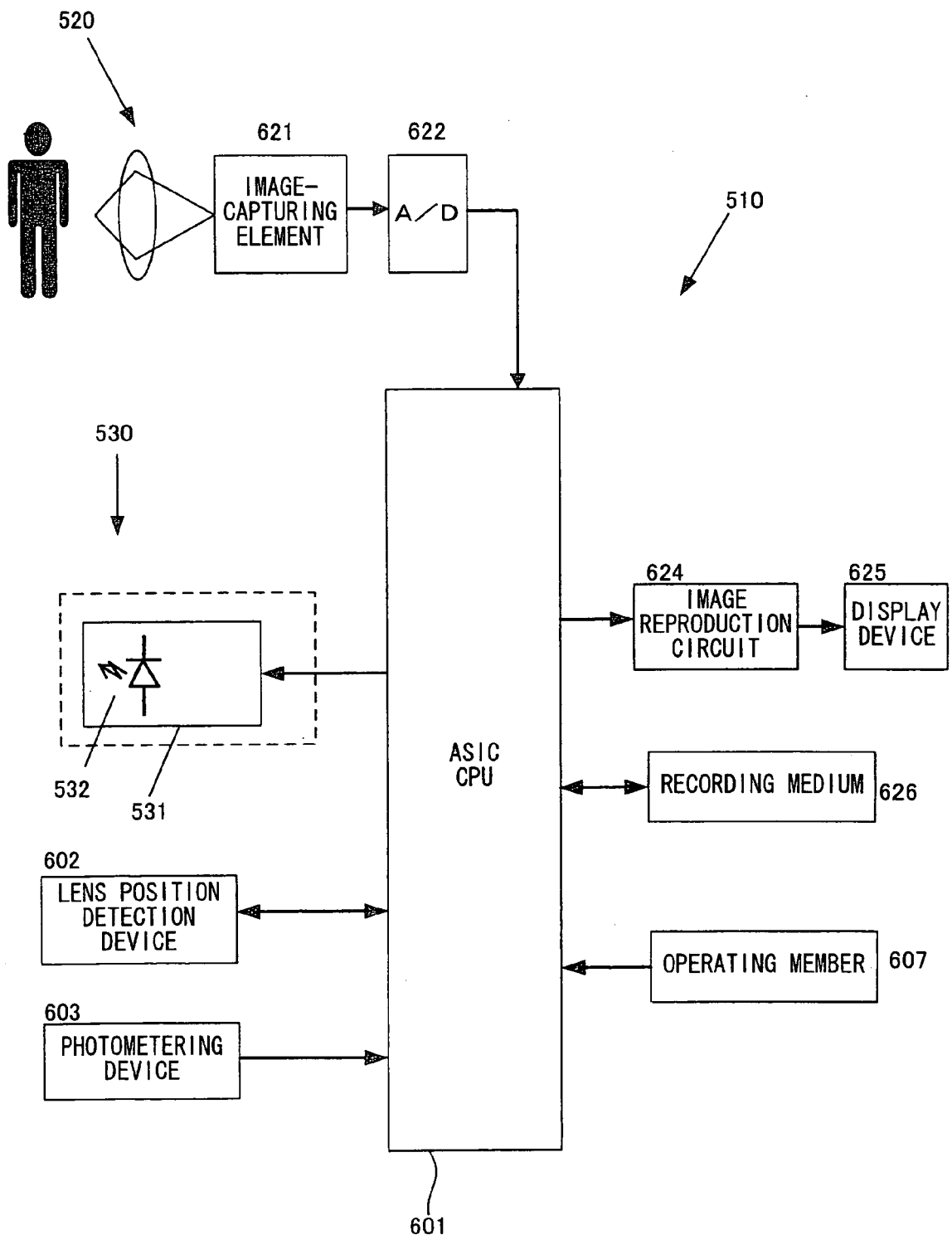
FIG. 18 is a block diagram of the essential structure adopted in the electronic camera system in FIG. 17.

FIG. 18 is a block diagram showing the essential structure adopted in the electronic camera system in FIG. 17. The illuminating device 530, which includes LEDs (light emitting diodes) 532 and a light emission circuit 531 provided in conjunction with the LEDs, is mounted at the electronic camera body 510. The illuminating device 530 engages in communication with a CPU at the camera body 510 via a communication contact point (not shown) present at the accessory shoe to receive signals provided as instructions for emitting light at (turning on) and turning off the LEDs 532, a signal indicating the light emission brightness and the like.

The CPU 601 in the electronic camera body 510 is constituted with an ASIC or the like. The CPU 601 executes specific arithmetic operations by using signals input thereto from various blocks to be detailed later and outputs control signals generated based upon the arithmetic operation results to the individual blocks.

A subject light flux having entered the electronic camera body 510 through the photographic lens 520 is guided to an image-capturing element 621 via a shutter (not shown). The image-capturing element 621 is constituted with a CCD image sensor or the like. The image-capturing element 621 captures an image formed with the subject light flux and outputs image capturing signals to an A/D conversion circuit 622. The A/D conversion circuit 622 converts the analog image capturing signal to a digital signal.

The CPU 601 executes image processing such as white balance processing on image data resulting from the digital conversion and also executes compression processing for compressing the image, data having undergone the image processing in a predetermined format, decompression processing for decompressing compressed image data and the like. A recording medium 626 is constituted with a memory card or the like that can be detachably loaded into the electronic camera body 510. Image data having undergone the image processing are recorded into the recording medium 626.

An image reproduction circuit 624 generates data for reproduced image display by using uncompressed image data (image data yet to be compressed or decompressed image data). At a display device 625, which may be constituted with, for instance, a liquid crystal display monitor, images are displayed by using the reproduced image display data.

An operating member 607 includes a shutter release switch that interlocks with an operation of a shutter release button (not shown), and outputs operation signals corresponding to the individual switches to the CPU 601.

A lens position detection device 602 detects the position of a zoom lens (not shown) in the photographic lens 520 and outputs a detection signal to the CPU 601. The zoom lens position detection signal corresponds to focal length information. A photometering device 603 detects the quantity of the subject light and outputs a detection signal to the CPU 601.

The CPU 601 calculates the subject brightness BV based upon the detection signal output from the photometering device 603. When the illuminating device 530 is set in a light emission-enabled state, the CPU 601 executes a specific exposure calculation by using a current aperture value setting AV, a current shutter speed setting TV, the subject brightness BV calculated as described above and a current image capturing sensitivity setting SV to determine the quantity of light that needs to be emitted from the illuminating device 530. In addition, the CPU 601 determines the illuminating angle of the illuminating device 530 based upon the focal length information so as to illuminate the area within the angle of view in an optimal manner. Namely, the illuminating angle is determined in correspondence to the angle of view defined by the specific photographic lens 520 being used.

According to the present invention, the ON/OFF states of the LEDs 532 are adjusted in correspondence to the illuminating angle.

The light emission circuit 531 turns on/off the LEDs 532 in response to light emission instructions provided by the CPU 601. The light emission instructions issued by the CPU 601 include a light emission start signal, a light emission end signal, a signal indicating the quantity of light to be emitted from each LED and a signal indicating the illuminating angle to be achieved by the illuminating device 530. The CPU 601 transmits the light emission start signal so that the illuminating device 530 enters an ON state after the shutter (not shown) becomes fully open and transmits the light emission end signal so that the illuminating device 530 enters an OFF state before the shutter (not shown) starts closing.

Figure 19:
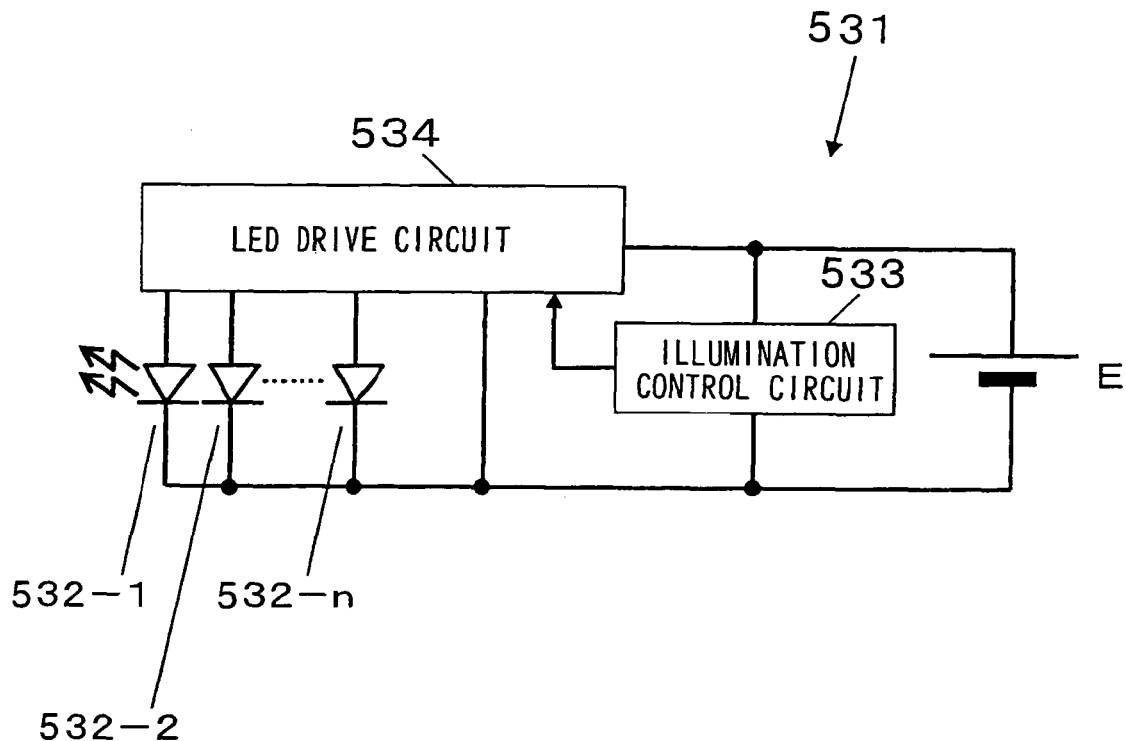
FIG. 19 shows an example of a structure that may be adopted in conjunction with the LEDs and the light emission circuit.

FIG. 19 shows an example of a structure that may be adopted in conjunction with the LEDs 532 and the light emission circuit 531. In the example shown in FIG. 19, there are n white LEDs 532-1 to 532-n. The LEDs can be individually turned on and off independently of one another. As is known, an LED is a current-controlled device that manifests a proportional relation between the drive current and the light emission intensity (light power) within its rated range. The light emission instruction output from the CPU 601 are input to an illumination control circuit 533.

The illumination control circuit 533 determines the value of the electrical current to be supplied to each LED to be turned on based upon the contents of the light quantity instruction provided by the CPU 601 and transmits a command for an LED drive circuit 534 to supply an electrical current achieving the current value thus determined to the corresponding LED. The levels of brightness achieved as specific LEDs are turned on are thus controlled.

A relationship between the light emission brightness level at each LED and the electrical current supplied thereto is indicated in data obtained based upon the results of actual measurements that are stored in advance in the form of a table at a non-volatile memory in the illumination control circuit 533. The illumination control circuit 533 references the table by using the light emission brightness as an argument and determines the level of the electrical current that needs to be supplied. The illumination control circuit then indicates the current value thus determined to the LED drive circuit 534. The LED drive circuit 534 supplies electrical current to the corresponding LEDs in response to the command output by the illumination control circuit 533. It is to be noted that a battery E is a source of power used in the illumination control circuit 533 and the LED drive circuit 534.

Figure 20:
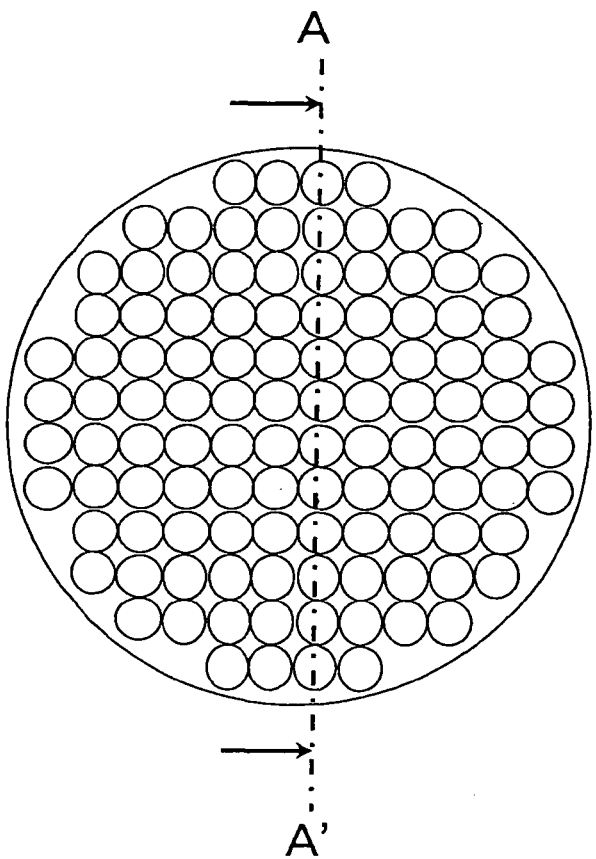
FIG. 20 shows the light emission window viewed from the subject side.

FIG. 20 shows a light emission window 535 of the illuminating device 530 (see FIG. 17), viewed from the subject side. As shown in FIG. 20, the n LEDs 532-1 to 532-n are arranged in a circular array. Light emitted from each LED travels toward the subject through a lens formed at the light emission window 535. The LEDs 532-1 to 532-n each have directivity that allows the LED to illuminate a predetermined range, and the centers of the illuminating ranges of the individual LEDs are different from one another.

Figure 21:
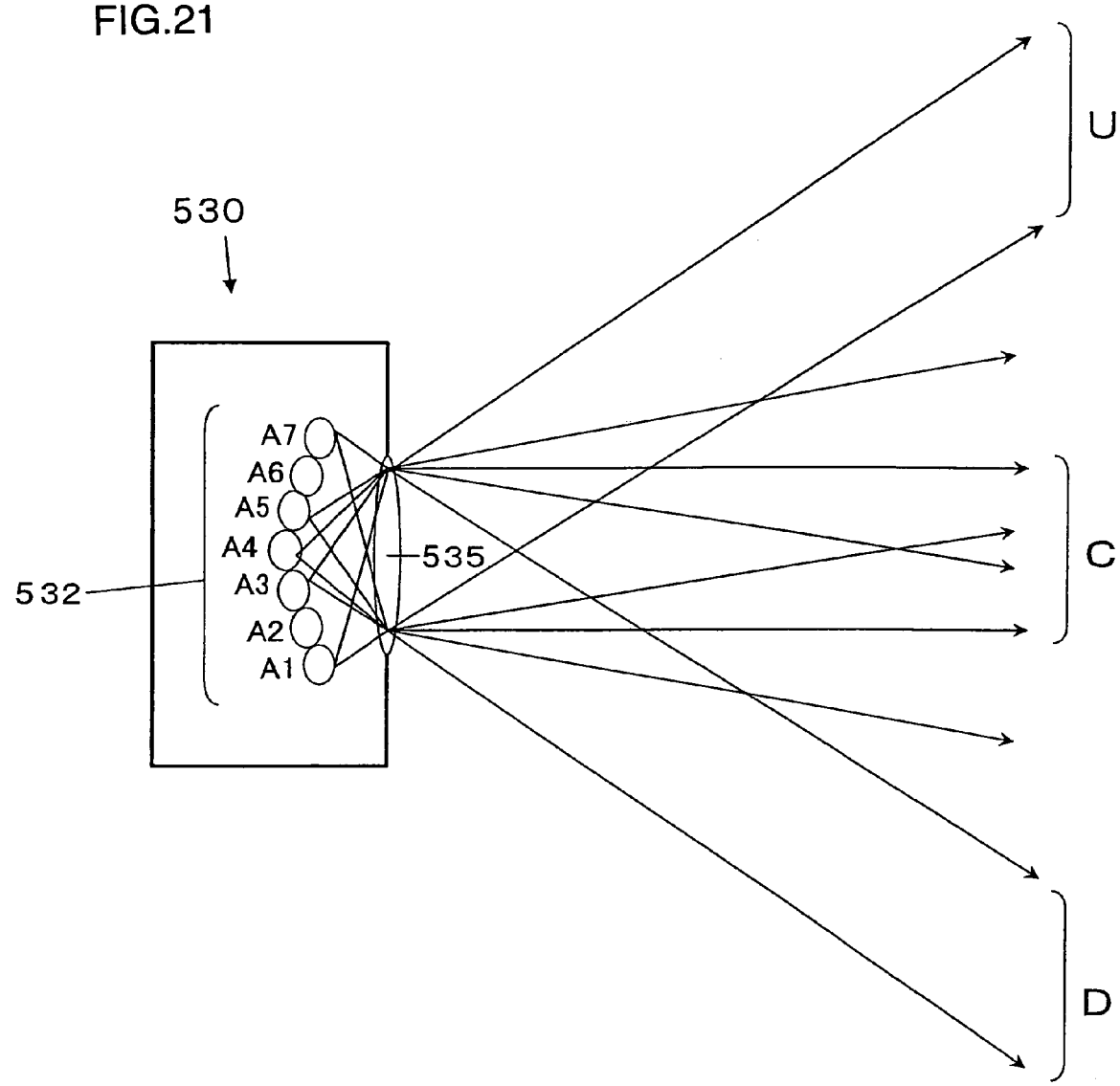
FIG. 21 shows the illuminating ranges of the individual LEDs.

FIG. 21 is a sectional view of the illuminating device 530 taken along the one-dot chain line A-A' in FIG. 20, illustrating the illuminating ranges of the individual LEDs. FIG. 21 is a simplified illustration showing only seven LEDs present on the sectional plane. The illuminating light emitted from an LED A1 is guided to an upper area U in FIG. 21 via the lens 535. The illuminating light from an LED A4 is guided toward a central area C along the vertical direction in FIG. 21 via the lens 535. In addition, the illuminating light from an LED A7 is guided to a lower area D in FIG. 21. Likewise, the illuminating light fluxes emitted from an LED A2, an LED A3, an LED A5 and an LED A6 are guided via the lens 535 to different positions so as to fill in the illuminating ranges of the LED A1, the LED A4 and the LED A7 described above. Thus, the illuminating ranges of the LED A7 to the LED A1 are different from one another. The central area C corresponds to the center in the photographic range, whereas the upper area U and the lower area D correspond to the peripheral area within the photographic range.

While an explanation is given above in reference to FIG. 21 by using a sectional view taken along the vertical direction, which contains the center of the lens 535, different illuminating ranges are achieved with the LEDs in a similar manner on sections taken along the horizontal direction and diagonal directions, which contain the center of the lens 535. Since the plurality of LEDs illuminate ranges different from one another as described above, the illuminating device 530 is able to illuminate the overall photographic range evenly. It is to be noted that the illuminating ranges of the individual LEDs are set so as to partially overlap the illuminating ranges of the adjacent LEDs and, as a result, the intensity of the illuminating light is evenly distributed.

The illumination control circuit 533 selects the LEDs to be turned on based upon the contents of the illuminating angle instruction provided by the CPU 601 and outputs a command for the LED drive circuit 534 to turn on the selected LEDs. Through this processing, the illuminating angle achieved by the illuminating device 530 is controlled. In the embodiment, when the zoom lens is set at the wide angle end, the n LEDs 532-1 to 532-n are all turned on to achieve the largest possible illuminating angle. When the zoom lens is set on the narrow angle side (on the telephoto side), the number of LEDs to be turned on is reduced to achieve a smaller illuminating angle in correspondence to the zoom lens position.

Data indicating the relationship between the illuminating angle of the illuminating device 530 and the LEDs to be turned on to achieve the illuminating angle are stored in advance in the form of a table in the nonvolatile memory within the illumination control circuit 533. The illumination control circuit 533 references the table by using the focal length information as an argument and issues an instruction for the LED drive circuit 534 to turn on the LEDs indicated by the table data. The LED drive circuit 534, in turn, supplies electrical currents to the LEDs to be turned on in response to the command output from the illumination control circuit 533.

Figure 22:
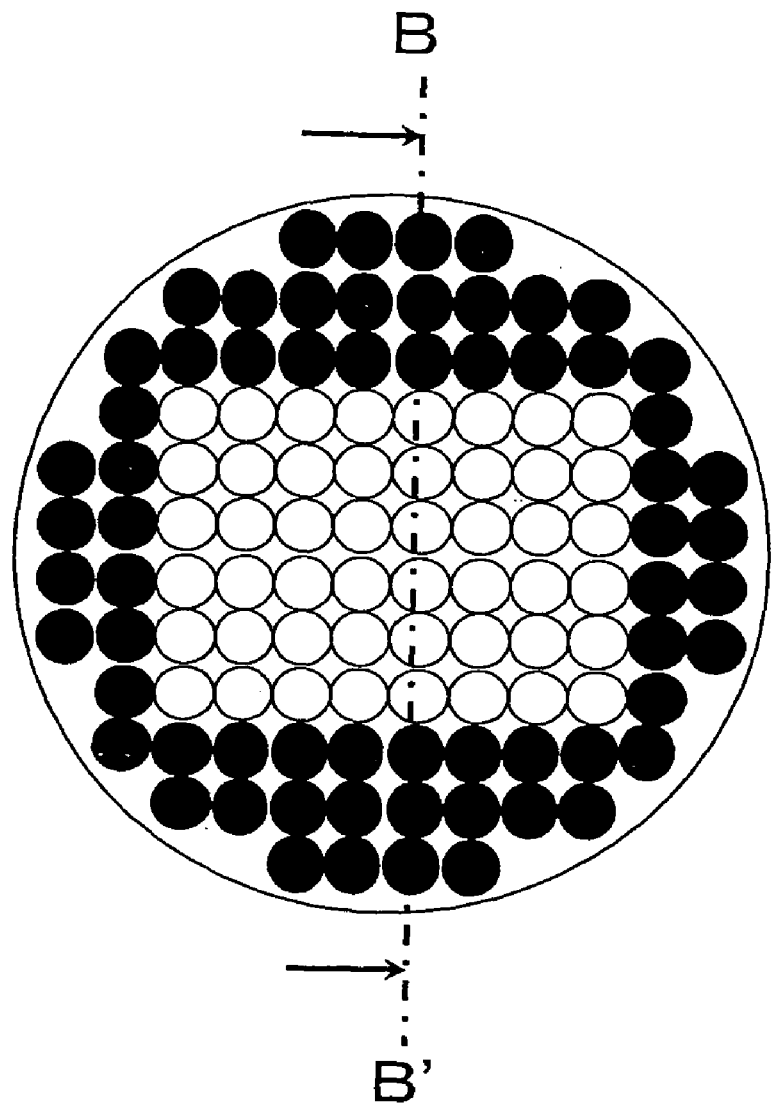
FIG. 22 shows the state of the light emission window when the illuminating angle is reduced.

FIG. 22 shows the state of the light emission window 535 when the illuminating angle of the illuminating device 530 is reduced, viewed from the subject side. As shown in FIG. 22, among the n LEDs 532-1 to 532-n arranged in the circular array, the LEDs located on the outer side are not turned on (remain in an OFF state). The black LEDs indicate the LEDs that are not turned on.

Figure 23:
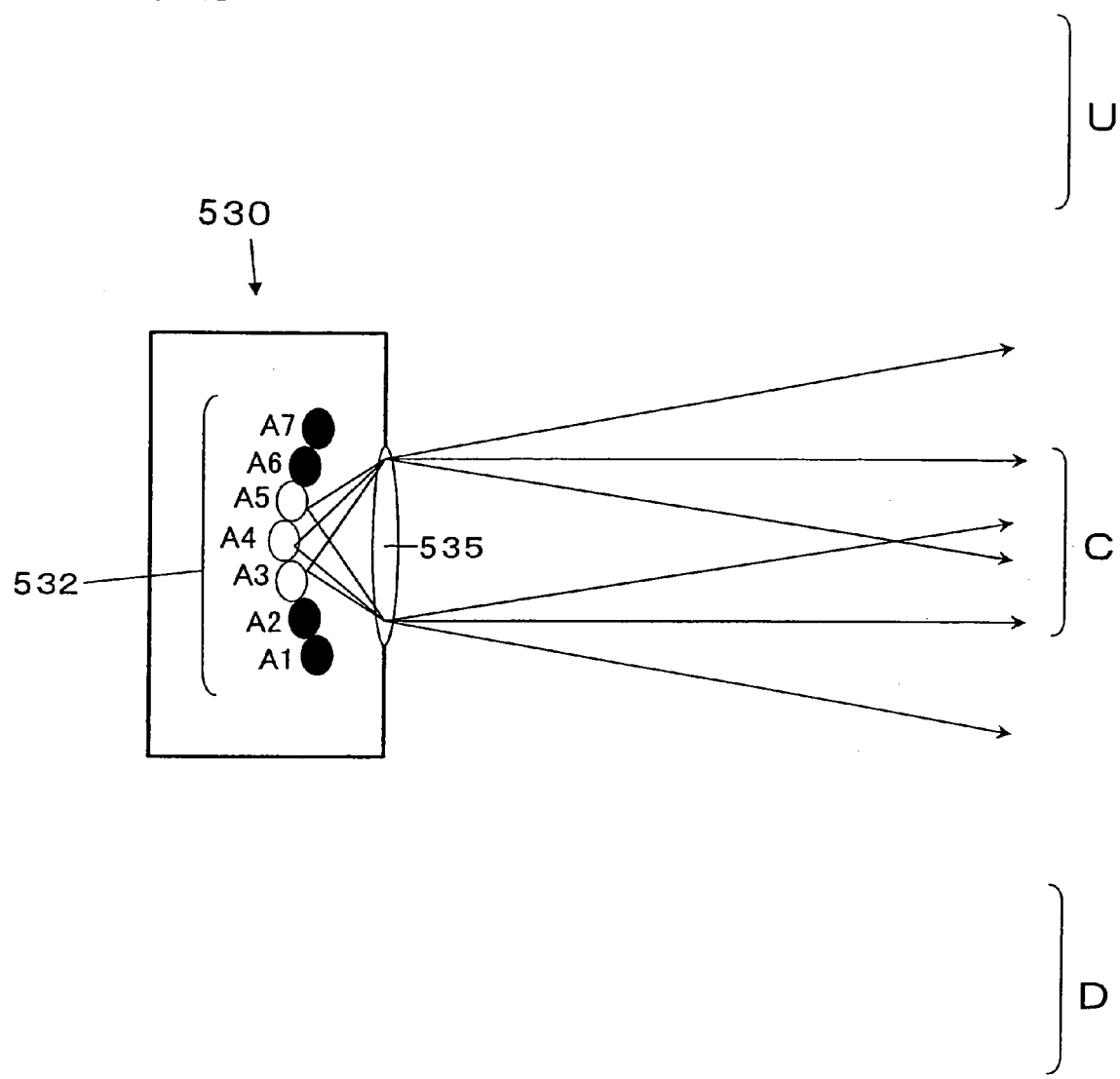
FIG. 23 shows the illuminating range when the illuminating angle is reduced.

FIG. 23 is a sectional view of the illuminating device 530 taken along the one-point chain line B-B' in FIG. 22, illustrating the illuminating ranges of the LEDs 532 when the illuminating angle is reduced. As in FIG. 21, only seven LEDs are shown on the sectional plane. It differs from the state shown in FIG. 21 in that the upper area U and the lower area D are not illuminated since the LEDs A1, A2, A6 and A7 remain in an OFF state.

Figure 24:
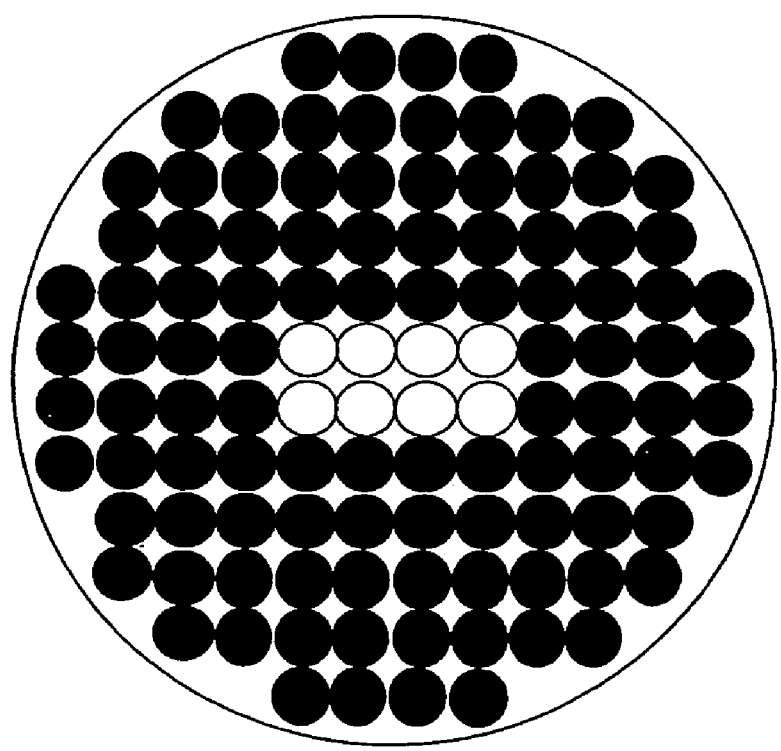
FIG. 24 shows the state of the light emission window when the illuminating angle is further reduced.

FIG. 24 shows the state at the light emission window 535 of the illuminating device 530 when the illuminating angle is further reduced, viewed from the subject side. Among the n LEDs 532-1 to 532-n, only the LEDs at the center are turned on in FIG. 24. When the zoom lens is set at the narrow angle end (the telephoto end), the smallest illuminating angle is selected by turning on only the LEDs present at the center among the n LEDs 532-1 to 532-n and leaving the other LEDs in an OFF state in the embodiment.

As described above, the center in the angle of view is illuminated with the LEDs disposed at the center among the n LEDs and the peripheral area within the angle of view are illuminated with the LEDs disposed at the peripheral positions among the n LEDs. In order to widen the illuminating angle, the illumination control circuit 533 gradually increases the number of LEDs to be turned on, starting with the LEDs located at the center to eventually include LEDs located further toward the periphery.

The fifth embodiment described above achieves the following advantages.

(1) At the illuminating device 530 constituted with a plurality of light emitting elements (white LEDs 532-1 to 532-n), the required illuminating angle is achieved by adjusting the number of light emitting elements to be turned on. The illuminating angle is determined based upon the focal length information so as to illuminate the range within the angle of view in an optimal manner. Unlike the technology in the related art, this method does not require a mechanical moving mechanism and thus, a compact and lightweight illuminating device 530 is realized. In addition, since the illuminating angle can be adjusted simply by selecting specific LEDs to be turned on/off, the illuminating angle can be adjusted more speedily compared to the adjustment achieved through a mechanical moving operation. This feature is particularly effective during a continuous photographing operation performed by adjusting the zoom magnification factor.

(2) Since the light emitting elements are constituted with white LEDs, the power requirement is not as significant as that of a discharge-controlled type light source such as a xenon tube. Furthermore, the illuminating device does not need a high-voltage charge circuit for inducing discharge light emission. In addition, the use of LEDs, the light emission brightness levels of which can be adjusted in proportion to the values of the electrical currents supplied thereto, facilitates the light output adjustment.

While the LEDs 532-1 to 532-n are arranged in a circular array at the illuminating device 530 described above, the LEDs may instead be arranged in a rectangular array or an elliptical array elongated along the horizontal direction in correspondence to the shape of the photographic image plane (e.g., elongated along the horizontal direction).

Figure 25:
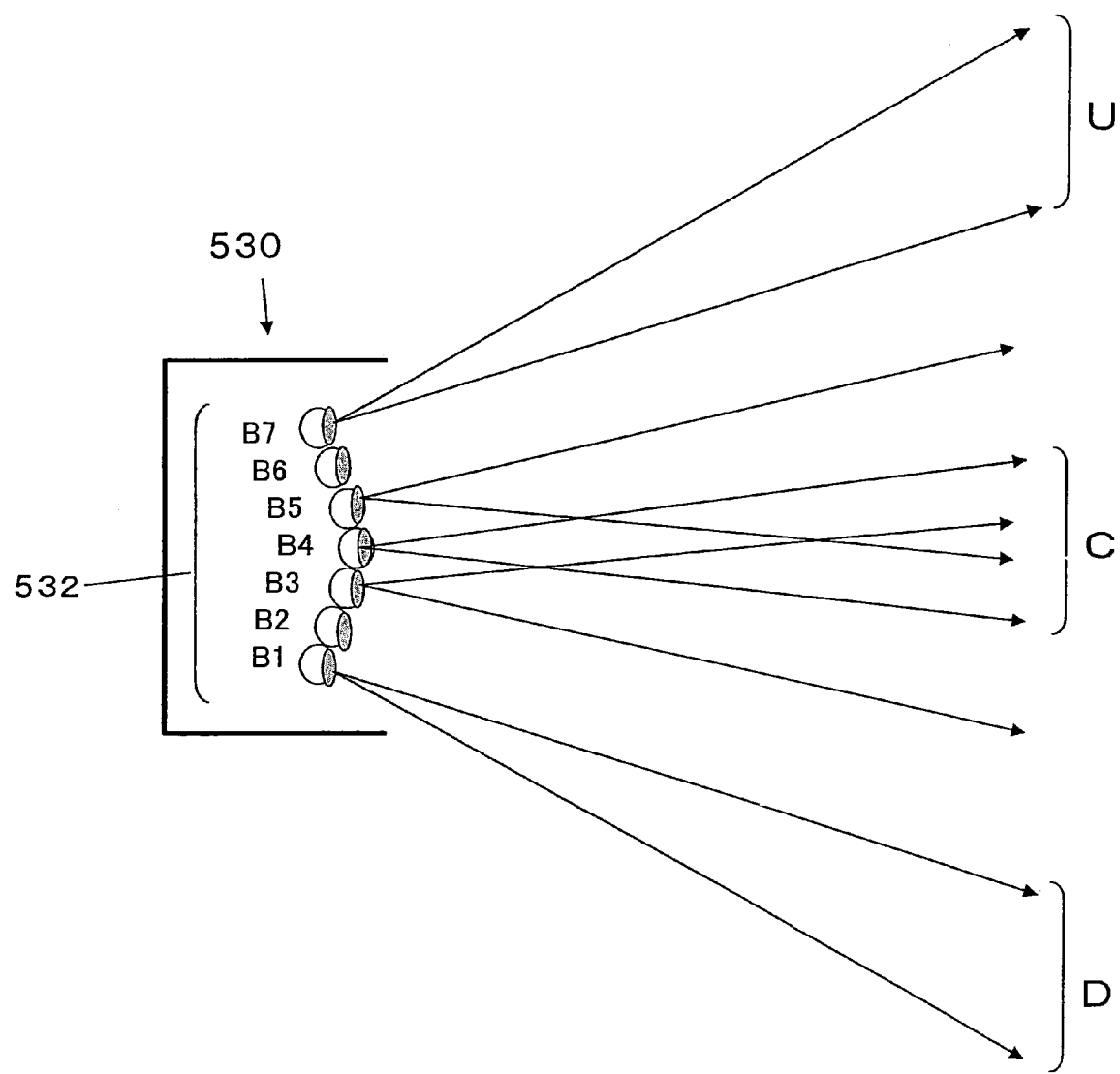
FIG. 25 shows the illuminating ranges achieved with LEDs each fitted with its own lens.

In the explanation provided above, the light fluxes from the various LEDs having passed through the lens 535 illuminate ranges different from one another. As an alternative, a lens may be disposed at each LED so as to allow the individual LEDs to illuminate ranges different from one another without the lens 535. FIG. 25 illustrates the illuminating ranges of LEDs each having its own lens disposed thereat in a sectional view of the illuminating device taken along the vertical direction. The illuminating light from an LED B1 advances toward a lower area D in FIG. 25. The illuminating light from an LED B4 advances to a central area C along the vertical direction in FIG. 25. In addition, the illuminating light from an LED B7 advances to an upper area U in FIG. 25. Likewise, the illuminating light fluxes emitted from an LED B2, an LED B3, an LED B5 and an LED B6 advance to different positions so as to fill in the illuminating ranges of the LED B1, the LED B4 and the LED B7 described above.

While an explanation is given above in reference to FIG. 25 by using a sectional view taken along the vertical direction, different illuminating ranges are achieved with the LEDs in a similar manner on sections taken along the horizontal direction and diagonal directions. Since the plurality of LEDs illuminate ranges different from one another as described above, the illuminating device 530 is able to illuminate the photographic area evenly. It is to be noted that the illuminating ranges of the individual LEDs are set so as to partially overlap the illuminating ranges of the adjacent LEDs and, as a result, the intensity of the illuminating light is more evenly distributed, as in the embodiment explained above.

In the explanation provided above, the n LEDs 532-1 to 532-n are disposed with a uniform density from the central area through the peripheral area, as shown in FIG. 20. Under normal circumstances, the brightness of the subject illuminated with an illuminating device is lower in the peripheral area of the photographic range than in the central area of the photographic range. In particular, the quantity of light in the peripheral area becomes markedly lower when the zoom lens is set at a position toward the wide angle side (toward the wide side). It is desirable to compensate for the lower quantity of light over the peripheral area in the photographic range by raising the density at which LEDs for illuminating the peripheral area of the photographic range are disposed compared to the density at which the LEDs for illuminating the central area of the photographic range are disposed.

Alternatively, the lowered quantity of light in the peripheral area of the photographic range may be compensated by raising the levels of light emission brightness achieved with the LEDs for illuminating the peripheral area of the photographic range without varying the density at which the LEDs are disposed. In such a case, the illumination control circuit 533 should issue an instruction for the LED drive circuit 534 to set larger values for the electrical currents to be supplied to the LEDs for illuminating the peripheral area of the photographic range relative to the values of the electrical currents supplied to the LEDs for illuminating the central area of the photographic range.

The light quantities may be controlled so as to raise the brightness of the subject at the center of the photographic range. When the zoom lens is set on the telephoto side the illuminating light from the illuminating device may not always reach a subject far from the camera (illuminating device). Such a subject located at a distant position can be illuminated by raising the density at which the LEDs for illuminating the central area of the photographic range are disposed relative to the density at which the LEDs for illuminating the peripheral area of the photographic range are disposed so as to illuminate the central area of the photographic range with concentrated light.

Instead of varying the density with which the LEDs are disposed, the level of the light emission brightness of the LEDs for illuminating the central area of the photographic range may be raised to illuminate the central area of the photographic range with greater brightness. In such a case, the illumination control circuit 533 should issue an instruction for the LED drive circuit 534 to increase the values of the electrical currents to be supplied to the LEDs for illuminating the central area of the photographic range relative to the values of the electrical currents to be supplied to the LEDs for illuminating the peripheral area of the photographic range.

The guide number for the wide angle photographing operation and the guide number for the telephoto photographing operation may be made to match. In this case, the density at which the LEDs for illuminating the peripheral area of the photographic range should be raised relative to the density with which the LEDs for illuminating the central area of the photographic range are disposed so as to ensure that no difference occurs between the brightness level in the central area and the brightness level in the peripheral area within the photographic range. In addition, the illumination control circuit 533 should issue an instruction for the LED drive circuit 534 to further increase the values of the electrical currents to be supplied to the individual LEDs as the zoom lens is set further toward the telephoto end.

In the explanation provided above, the illuminating ranges achieved with light fluxes emitted from the individual LEDs are substantially equal to one another (the LEDs achieve uniform directivity). Instead, the light fluxes emitted from the LEDs located at the center among the n LEDs 532-1 to 532-n arranged in, for instance, a circular array, may achieve the directivity described earlier and the directivity of the light fluxes emitted from the LEDs located further outward may be set lower than the directivity of the light fluxes from the central LEDs. Namely, the LEDs disposed further outward may be used to illuminate wider illuminating ranges than the LEDs disposed at the center.

While the externally mounted illuminating devices 30, 320 and 530 are used in the first through fifth embodiments explained above, the present invention may be adopted in conjunction with an illuminating device built into the camera body.

Such a camera with a built-in illuminating device may be a portable telephone equipped with a camera.

The camera body described above may be a digital camera or a silver halide-type camera.

The above described embodiments are examples and various modifications can be made without departing from the spirit and scope of the invention.

What is claimed is:

1. An illuminating device for photographing, comprising:
   an illuminating unit having a plurality of light emitting elements with axes of illuminating light fluxes from the plurality of light emitting elements different from one another, which illuminates a subject with light emitted;
   a light emission control unit that performs at least one of light emission/non-emission setting and light emission brightness level setting for each of the plurality of light emitting elements, so as to achieve a specific illumination pattern; and
   a display unit that displays the specific illumination pattern illuminated by the illuminating unit.

2. An illuminating device for photographing according to claim 1, wherein:
   the display unit displays a light emission/non-emission status and a light emission brightness level set for each of the plurality of light emitting elements by the light emission control unit, and
   an operating unit outputs an operation signal indicating the light emission/non-emission setting and an operation signal indicating the light emission brightness level setting; and
   a display control unit updates display contents displayed by the display unit based upon the operation signals output from the operating unit.

3. An illuminating device for photographing according to claim 2, wherein:
   the display contents displayed by the display unit indicate the illumination pattern.

4. An illuminating device for photographing according to claim 2, further comprising:
   a storage unit in which sets of information each indicating one of a plurality of illumination patterns are stored, wherein:
   the light emission control unit performs setting for the plurality of light emitting elements so as to achieve an illumination pattern corresponding to a set of information read out from the storage unit.

5. An illuminating device for photographing according to claim 2, further comprising:
   an illumination pattern altering unit that alters the illumination pattern in response to an operation signal output from the operating unit.

* * * * *